(12) United States Patent
Alameh et al.

(10) Patent No.: US 12,197,549 B2
(45) Date of Patent: Jan. 14, 2025

(54) ELECTRONIC DEVICES WITH PROXIMITY AUTHENTICATION AND GAZE ACTUATION OF COMPANION ELECTRONIC DEVICES AND CORRESPONDING METHODS

(71) Applicant: Motorola Mobility LLC, Chicago, IL (US)

(72) Inventors: Rachid Alameh, Crystal Lake, IL (US); John Gorsica, Round Lake, IL (US); Thomas Merrell, St. Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 531 days.

(21) Appl. No.: 17/393,705

(22) Filed: Aug. 4, 2021

(65) Prior Publication Data

US 2021/0365534 A1   Nov. 25, 2021

Related U.S. Application Data

(63) Continuation of application No. 16/565,244, filed on Sep. 9, 2019, now Pat. No. 11,113,375.

(51) Int. Cl.
*G06F 21/32* (2013.01)
*G06F 1/16* (2006.01)
(Continued)

(52) U.S. Cl.
CPC .............. *G06F 21/32* (2013.01); *G06F 1/163* (2013.01); *G06F 3/013* (2013.01);
(Continued)

(58) Field of Classification Search
CPC .......... G06F 21/32; G06F 1/163; G06F 3/013; G06F 1/1626; G06F 1/1698; G06F 21/34;
(Continued)

(56) References Cited

U.S. PATENT DOCUMENTS

| 8,594,374 B1 | 11/2013 | Bozarth |
| 9,035,878 B1 * | 5/2015 | Wheeler ............. G06F 3/03547 |
| | | 345/157 |

(Continued)

FOREIGN PATENT DOCUMENTS

| CN | 104850769 | 8/2015 |
| EP | 2500898 | 9/2012 |

(Continued)

OTHER PUBLICATIONS

Apple Inc, "Getting Started with iBeacon", Version 1.0, Jun. 2, 2014, pp. 1-11, taken from https://developer.apple.com/ibeacon/Getting-Started-with-iBeacon.pdf.

(Continued)

*Primary Examiner* — Piotr Poltorak
*Assistant Examiner* — Suman Debnath
(74) *Attorney, Agent, or Firm* — Philip H. Burrus, IV

(57) ABSTRACT

A wearable electronic device includes one or more processors identifying one or more companion electronic devices operating within a wireless communication radius of the wearable electronic device. One or more sensors identify the wearable electronic device being within a predefined distance of a companion electronic device. A wireless communication circuit, responsive to the one or more processors, delivers an authentication credential to the companion electronic device in response to the one or more sensors identifying that the wearable electronic device is within the predefined distance of the companion electronic device. The one or more sensors thereafter detect a gaze of an authorized user of the wearable electronic device being directed at the companion electronic device, where the wireless communication circuit delivers an actuation command to the companion electronic device.

20 Claims, 9 Drawing Sheets

(51) Int. Cl.
   *G06F 3/01* (2006.01)
   *H04L 9/40* (2022.01)
   *H04W 4/80* (2018.01)
   *H04W 12/06* (2021.01)
   *H04W 12/63* (2021.01)

(52) U.S. Cl.
   CPC ........... *H04L 63/0861* (2013.01); *H04W 4/80* (2018.02); *H04W 12/06* (2013.01); *H04W 12/63* (2021.01)

(58) Field of Classification Search
   CPC ... G06F 21/44; H04L 63/0861; H04L 67/303; H04L 63/0853; H04W 4/80; H04W 12/06; H04W 12/63; H04W 4/023; H04W 12/33
   See application file for complete search history.

(56) References Cited

U.S. PATENT DOCUMENTS

| | | |
|---|---|---|
| 9,274,599 B1 | 3/2016 | D'Amico et al. |
| 10,063,677 B2 | 8/2018 | Cavallaro et al. |
| 2002/0138767 A1 | 9/2002 | Hamid |
| 2003/0172283 A1 | 9/2003 | O'Hara |
| 2007/0057935 A1 | 3/2007 | Takagi |
| 2007/0171921 A1 | 7/2007 | Wookey |
| 2008/0238610 A1 | 10/2008 | Rosenberg |
| 2009/0240940 A1 | 9/2009 | Shoemake et al. |
| 2010/0079508 A1* | 4/2010 | Hodge .................. G06F 1/3206 345/697 |
| 2011/0095974 A1 | 4/2011 | Moriwaki |
| 2011/0312311 A1 | 12/2011 | Abifaker et al. |
| 2012/0283894 A1 | 11/2012 | Naboulsi |
| 2013/0076663 A1 | 3/2013 | Sirpal et al. |
| 2014/0028435 A1 | 1/2014 | Brockway, III |
| 2014/0098095 A1 | 4/2014 | Lee |
| 2014/0118317 A1 | 5/2014 | Song et al. |
| 2014/0160337 A1 | 6/2014 | Van Den Herik |
| 2014/0267034 A1* | 9/2014 | Krulce .................... G06F 21/32 345/158 |
| 2014/0267299 A1* | 9/2014 | Couse ................... G06T 11/206 345/440.2 |
| 2014/0306985 A1 | 10/2014 | Jeong |
| 2014/0320274 A1 | 10/2014 | De Schepper et al. |
| 2014/0350883 A1 | 11/2014 | Carter et al. |
| 2015/0022515 A1 | 1/2015 | Ikeda et al. |
| 2015/0042674 A1 | 2/2015 | Lin |
| 2015/0081559 A1 | 3/2015 | Dua |
| 2015/0146387 A1 | 5/2015 | Lee |
| 2015/0163221 A1 | 6/2015 | Bolin et al. |
| 2015/0177789 A1 | 6/2015 | Jinbo |
| 2015/0186636 A1 | 7/2015 | Tharappel |
| 2015/0227223 A1 | 8/2015 | Kang et al. |
| 2015/0286813 A1 | 10/2015 | Jakobsson |
| 2015/0301672 A1 | 10/2015 | Kim et al. |
| 2015/0338916 A1 | 11/2015 | Priyantha et al. |
| 2015/0348453 A1 | 12/2015 | Jin et al. |
| 2015/0358315 A1 | 12/2015 | Cronin |
| 2016/0019423 A1 | 1/2016 | Ortiz et al. |
| 2016/0021168 A1 | 1/2016 | Chaudhri et al. |
| 2016/0034029 A1 | 2/2016 | Lyons et al. |
| 2016/0041949 A1* | 2/2016 | Gluck ................... G06F 3/0484 715/256 |
| 2016/0057139 A1 | 2/2016 | McDonough |
| 2016/0267732 A1 | 9/2016 | Agrfioti et al. |
| 2016/0269403 A1 | 9/2016 | Koutenaei et al. |
| 2017/0017313 A1 | 1/2017 | Rakshit |
| 2017/0126680 A1 | 5/2017 | Yusuf et al. |
| 2017/0177096 A1 | 6/2017 | Cheong et al. |
| 2017/0185289 A1 | 6/2017 | Kim |
| 2017/0212583 A1* | 7/2017 | Krasadakis ........... G06F 3/0482 |
| 2017/0263113 A1* | 9/2017 | Tiberi .................. G06K 7/1417 |
| 2017/0318019 A1 | 11/2017 | Gordon et al. |
| 2017/0323158 A1 | 11/2017 | Gordon |
| 2017/0345365 A1 | 11/2017 | Li |
| 2018/0020349 A1 | 1/2018 | Tyagi |
| 2018/0165437 A1* | 6/2018 | Shim ...................... G06V 40/20 |
| 2018/0165473 A1 | 6/2018 | Debickes et al. |
| 2018/0198783 A1* | 7/2018 | Liu ......................... H04W 76/10 |
| 2019/0007385 A1 | 1/2019 | Agrawal |
| 2019/0354178 A1* | 11/2019 | Hwang ................ H04N 21/4666 |
| 2020/0169568 A1* | 5/2020 | Kurian ................. H04W 12/06 |
| 2020/0349296 A1* | 11/2020 | Young ..................... G09C 5/00 |

FOREIGN PATENT DOCUMENTS

| | | |
|---|---|---|
| EP | 2793214 | 10/2014 |
| WO | 2015016160 | 2/2015 |
| WO | 2015/187504 | 12/2015 |
| WO | 2015/195011 | 12/2015 |

OTHER PUBLICATIONS

Balduaf, Matthias et al., "Kibitzer: A wearable System for Eye-Gaze-based Mobile Urban Exploration", Published at Augmented hUman Conference; Apr. 2-3, 2010; Available online http://matthiasbaldauf.com/publications/Baldauf10b.pdf.

Belousov, Andrey, "NonFinal Office Action", U.S. Appl. No. 16/525,162, filed Jul. 29, 2019; Mailed Mar. 4, 2021.

Blackstone, Austin, "Understanding the Different Types of BLE Beacons", Mar. 24, 2015, p. 106, https://os.mbed.com/blog/entry/BLE-Beacons-URIBeacon-AltBeacons-IBeacon/.

Gee, Jason, "Final Office Action", U.S. Appl. No. 15/209,534, filed Jul. 13, 2016; Mailed Dec. 13, 2018.

Gee, Jason Kai Yin, "NonFinal OA", U.S. Appl. No. 15/209,524, filed Jul. 13, 2016; Mailed Jul. 6, 2018.

Gee, Jason Kai Yin, "NonFinal Office Action", U.S. Appl. No. 15/209,524, filed Jul. 13, 2016; Mailed Oct. 1, 2019.

Hauber, Jorg, "European Search Report", European Application No. EP 17179859; Mailed Oct. 9, 2017.

Kanaan, Simon, "NonFinal OA", U.S. Appl. No. 15/209,514, Filed Jul. 13, 2016; Mailed Apr. 2, 2018.

Kanaan, Simon, "NonFinal Office Action", U.S. Appl. No. 15/209,514, filed Jul. 13, 2016; Mailed Dec. 13, 2018.

Kanaan, Simon, "Notice of Allowance", U.S. Appl. No. 15/209,514, filed Jul. 13, 2016; Mailed May 20, 2019.

Karam, Tony, "Passwords: Make Way for Proximity Authentication", Published online on Mar. 2, 2018 at https://www.technative.io/passwords-make-way-for-proximity-authentication/.

Morris, Euros, "GB Search Report and Written Opinion", GB Application No: GB1710801.0; Mailed Dec. 20, 2017; Search Date Dec. 18, 2017.

Morris, Euros, "Great Britain Search Report", GB Application No. 1710801.0; Mailed Dec. 17, 2018.

Morris, Euros, "Office Action", GB1710801.0; Mailed Feb. 5, 2020.

Nield, David, "Change Your Android Phone's Setting Based on Where You Are", Gizmodo; Published Jul. 1, 2014 online at https://gizmodo.com/change-your-android-phones-settings-based-on-where-you-1597903597.

Rashid, Harunur, "Final Office Action", U.S. Appl. No. 15/209,530, Filed Jul. 13, 2016; Mailed Aug. 23, 2018.

Rashid, Harunur, "NonFinal OA", U.S. Appl. No. 15/209,530, filed Jul. 13, 2016; Mailed Feb. 22, 2018.

Rashid, Harunur, "Notice of Allowance", U.S. Appl. No. 15/209,530, filed Jul. 13, 2016; Mailed Jan. 25, 2019.

Saddington, Aaron, "GB Search and Written Opinion", GB Application No. GB1710820.0; Mailed Dec. 19, 2017.

Steckert, Markus, "Office Action", German Application No. 102017115316.0; Mailed Mar. 2, 2020.

Thomas, Dallas, "Mirror & Control Your Android's Screen on Your Windows PC", Gadget Hacks; Published Dec. 12, 2016 online at https://android.gadgethacks.com/how-to/mirror-control-your-androids-screen-your-windows-pc-0175404/.

Tran, Kim Than Thi, "Final Office Action", U.S. Appl. No. 15/209,519, filed Jul. 13, 2016; Mailed May 8, 2018.

Tran, Kim Thanh Thi, U.S. Appl. No. 15/209,527, filed Jul. 13, 2016; Mailed Dec. 12, 2017.

(56) References Cited

OTHER PUBLICATIONS

Tran, Kim Thanh Thi, "Final OA", U.S. Appl. No. 15/209,527, filed Jul. 13, 2016; Mailed Jul. 12, 2018.
Tran, Kim Thanh Thi, "Final Office Action", U.S. Appl. No. 15/209,519, filed Jul. 13, 2016; Mailed Mar. 5, 2019.
Tran, Kim Thanh Thi, "NonFinal OA", U.S. Appl. No. 15/209,519, filed Jul. 13, 2016; Mailed Aug. 27, 2018.
Tran, Kim Thanh Thi, "NonFinal OA", U.S. Appl. No. 15/209,519, filed Jul. 13, 2016; Mailed Oct. 17, 2017.
Zanglein, Ulrike, "PCT Search Report", PCT/US2017/041435; International Filing Date Jul. 11, 2017; Mailed Sep. 21, 2017.

* cited by examiner

ELECTRONIC DEVICES WITH PROXIMITY AUTHENTICATION AND GAZE ACTUATION OF COMPANION ELECTRONIC DEVICES AND CORRESPONDING METHODS

CROSS REFERENCE TO PRIOR APPLICATIONS

This application is a continuation application claiming priority and benefit under 35 USC § 120 from U.S. application Ser. No. 16/565,244, filed Sep. 9, 2019, which is incorporated by reference for all purposes.

BACKGROUND

Technical Field

This disclosure relates generally to electronic devices, and more particularly to portable electronic devices with wireless communication capabilities.

Background Art

Mobile electronic communication devices are used by billions of people. The owners of such devices use them for many different purposes including, but not limited to, voice communications, text messaging, Internet browsing, calendar management, commerce such as banking, and social networking.

As these devices become more sophisticated, they can also become more complicated to operate. Illustrating by example, many "smart devices" now come equipped with touch sensitive displays rather than physical keyboards. While touching a surface is considered by some to be a simpler operation than working a complex keyboard, executing complex operations can require the navigation of several different menu tiers or user interface levels.

It would be advantageous to have simplified systems and methods for executing complex operations in modern electronic devices.

Figure 1:
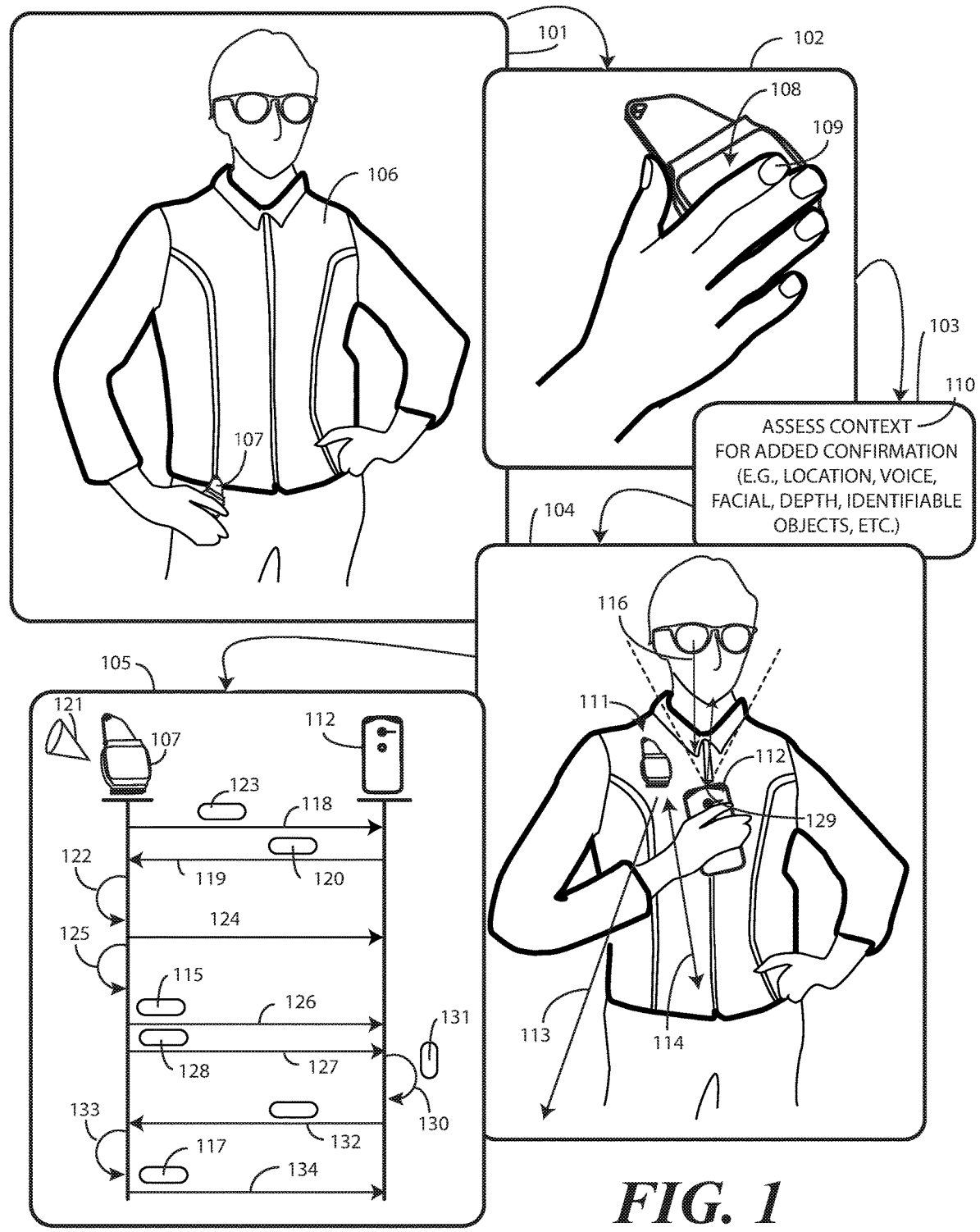
FIG. 1 illustrates one explanatory method for an electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to identifying proximately located companion electronic devices, delivering authentication credentials to the companion electronic devices as a function of their proximity, detecting a gaze of a person toward a companion electronic device, and actuating the companion electronic device in response to the gaze detection. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods operable on hardware platforms that, when applied to electronic device and/or user interface technology, improve the functioning of the electronic device itself by simplifying companion electronic device actuation to improve the overall user experience by overcoming problems specifically arising in the realm of the recently developed technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of authenticating a user to a companion electronic device that is proximately located with a wireless device, and then actuating a user interface component of the companion electronic device in response to detecting a user's gaze toward the companion electronic device as described herein. The non-processor circuits may include, but are not limited to, a radio receiver, a radio transmitter, signal drivers, clock circuits, power source circuits, and other user input devices.

As such, these functions may be interpreted as steps of a method to perform device authentication and actuation in response to proximity and gaze. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that is capable of authenticating a person to a companion electronic device, as well as actuating a user interface component of the companion electronic device in response to detecting either a user's gaze toward a particular companion electronic device, or alternatively detecting the user pointing the electronic device toward the companion electronic device. Advantageously, a person who has been authenticated by the electronic device can unlock and access companion electronic devices simply by being near them and looking at them. This allows a person to read news on a tablet computer, for example, simply by walking up to the tablet computer and looking at it. There is no need for the person to physically manipulate the tablet computer, enter passwords, navigate menus, or otherwise interact with the tablet computer. The simple act of being close to the tablet computer and gazing at causes information of interest to be seamlessly accessible.

In one or more embodiments, the electronic device is configured as a wearable electronic device. In one or more embodiments, the wearable electronic device includes a biometric sensor. In one or more embodiments, the biometric sensor is a fingerprint sensor.

In one or more embodiments, when a person picks up the wearable electronic device, the fingerprint sensor authenticates the person as an authorized user of the wearable electronic device. Presuming that the person applies the wearable electronic device to his self or her self in a worn configuration, such as by placing the wearable electronic device around a wrist or attaching the wearable electronic device to a piece of clothing, the person will remain authenticated as the authorized user of the electronic device. Only when the wearable electronic device is transitioned out of the wearable state, e.g., is removed from the wrist or detached from the clothing and placed on a table, does the person need to be reauthorized as the authorized user of the wearable electronic device.

In one or more embodiments, one or more sensors identify the wearable electronic device being within a predefined distance of a companion electronic device. In one or more embodiments, when this occurs, a wireless communication circuit responsive to one or more processors of the wearable electronic device delivers an authentication credential to the companion electronic device. In one or more embodiments, the authentication credential authenticates the person as an authorized user of the companion electronic device.

Despite the person being authenticated as an authorized user of the companion electronic device, in one or more embodiments the user interface components initially remain in an OFF state. For example, the display of the companion electronic device may remain blank, the loudspeakers, silent, and the lights in an OFF condition.

This changes, however, when the person gazes toward the companion electronic device. In one or more embodiments, after the wireless communication circuit delivers the authentication credential to the companion electronic device, in one or more embodiments the one or more sensors detect a gaze of the person toward the companion electronic device. In one or more embodiments, when this occurs the wireless communication circuit delivers an actuation command to the companion electronic device. In one or more embodiments, the actuation command causes a user interface component to become active. Illustrating by example, in one embodiment the delivery of the actuation command by the wireless communication circuit to the companion electronic device may cause the display to transition to an ON state and begin presenting information.

Advantageously, in one or more embodiments the wearable electronic device seamlessly communicates user credentials and grants user access to a proximately located companion electronic device falling within the authorized user's gaze. The engagement of the wearable electronic device with the companion electronic device, which can be selected from a plurality of proximately located companion electronic devices via gaze detection, grants access to the companion electronic device by unlocking the companion electronic device. Sometimes this is all that occurs. In other cases, gaze detection causes preferred information, e.g., emails, notifications, news briefs, reminders, and alerts, to be presented on a display in one or more embodiments. If the wearable electronic device becomes separated from the person, in one or more embodiments the authentication and actuation functions are disabled. Other embodiments, applications, and examples of how electronic devices configured in accordance with embodiments of the disclosure will be described below. Still others will be obvious to those of ordinary skill in the art having the benefit of this disclosure.

Turning now to FIG. 1, illustrated therein are one or more method steps for an electronic device configured in accordance with one or more embodiments of the disclosure. Beginning at step 101, an authorized user 106 of one or more electronic devices is shown. The authorized user 106 is shown holding an electronic device.

In this illustrative embodiment, and in other illustrative embodiments below, the electronic device is configured as a wearable electronic device 107. However, while a wearable electronic device 107 is used for illustrative purposes in describing the benefits and advantages offered by embodiments of the disclosure, it should be noted that the electronic device can take other forms as well. For example, in another embodiment the electronic device is instead a smartphone that, rather than being wearable and worn, stays in contact with the authorized user 106 by continually being in contact with the body of the authorized user 106, such as being within a pocket or in a hand. Other examples of electronic devices that can be substituted for the wearable electronic device 107 of FIG. 1 will be obvious to those of ordinary skill in the art having the benefit of this disclosure.

In one or more embodiments, the wearable electronic device 107 includes a biometric sensor 108. In one or more embodiments, the biometric sensor 108 is a fingerprint sensor. As shown at step 102, in one or more embodiments the biometric sensor 108 authenticates the authorized user 106 as being authorized to use the wearable electronic device 107 from biometric input 109 received at the biometric sensor 108. In this example, the biometric input 109 comprises a fingerprint. In one or more embodiments, the authentication provided by the biometric sensor 108 is almost instantaneous. In one or more embodiments, the authentication provided by the biometric sensor 108 occurs seamlessly without messing up the system.

Other examples of biometric input 109 suitable for use in authenticating a person as the authorized user of a wearable electronic device 107 will be obvious to those of ordinary skill in the art having the benefit of this disclosure. For example, iris scans, facial depth scans, facial recognition from images, or other biometric input 109 could be used to authenticate the authorized user 106 as well. If the wearable electronic device 107 were configured as a pair of smart glasses, it could use an iris scanner to scan the iris of a wearer instead of, or in addition to, a fingerprint sensor that may be configured in the stems. Where used in addition to a fingerprint sensor, an iris scan would elevate the authentication procedure to a very strong method of authentication.

In addition to these other forms of biometric input 109, authentication factors in addition to, or instead of, biometric authentication can be assessed at optional step 103. Where the authentication factors are in addition to the biometric input 109, such as assessing context 110 in addition to receiving a fingerprint at a fingerprint sensor, a more robust authentication process results. Where the authentication factors are used instead of the biometric input 109, such as entering a personal identification number (PIN) rather than placing a finger on a fingerprint sensor, the authentication process simply changes.

In one or more embodiments, step 103, where included, comprises assessing the context 110 in addition to the biometric input 109 for added confirmation, i.e., to require additional authentication thresholds be met prior to authenticating a person as the authorized user of the wearable electronic device 107. As used herein, the "context" refers to physical conditions, actions, and environments experienced by the wearable electronic device 107. For example, the context 110 of the wearable electronic device 107 can include determining the location in which the wearable electronic device 107 is situated with a location detector. Alternatively, the context 110 of the wearable electronic device 107 could include identifying persons within the vicinity of the wearable electronic device 107, motion that the wearable electronic device 107 is experiencing, or other actions that are occurring in an environment about the wearable electronic device 107.

Each context 110 deter can have one or more dimensions or modes. For example, in some embodiments, the context 110 will be one-dimensional or "uni-modal" in that it may include location only. The context 110 may be that the authorized user 106 and the wearable electronic device 107 are both situated in the kitchen of the authorized user's home. Alternatively, the context 110 may be that the authorized user 106 and the wearable electronic device 107 are both situated within the authorized user's vehicle. The context may be that the wearable electronic device 107 is being worn in a worn state, and so forth.

In another embodiment, the context 110 may be two-dimensional in that two context factors are used in the context determination. Continuing the examples from above, one two-dimensional context may be that the authorized user 106 and the wearable electronic device 107 are both situated in the kitchen of the authorized user 106, and that the authorized user 106 is wearing the wearable electronic device 107. Additional dimensions can be added to any context to make it multidimensional or multi-modal.

Examples of dimensions include location, location in two-dimensional space, e.g., geographic location and elevation above sea level, motion, what activity the authorized user 106 is performing, the time of day, the weather, sound levels, light levels, color levels, temperature, events occurring within the environment of the wearable electronic device 107, dates, social cues, optical intensity, color, light, or shadow in the environment of an wearable electronic device 107, whether the wearable electronic device 107 is in a public or a private setting, and so forth. These are merely examples of various dimensions that can be used to determine contexts in accordance with embodiments of the disclosure. Numerous others will be obvious to those of ordinary skill in the art having the benefit of this disclosure.

As will be described in more detail below with reference to FIG. 7, in one or more embodiments one or more processors of the wearable electronic device 107 will be operable with a context engine. The context engine can operate with the various sensors to detect, infer, capture, and otherwise determine contextual dimensions that are occurring in an environment about the wearable electronic device 107. Illustrating by example, in one or more embodiments the context engine determines assessed contexts and frameworks using adjustable algorithms of context assessment employing information, data, and events. These assessments may be learned through repetitive machine learning and data analysis. Alternatively, a user may employ the user interface to enter various parameters, constructs, rules, and/or paradigms that instruct or otherwise guide the context engine in detecting multi-dimensional social cues, emotional states, moods, and other contextual information. The context engine can comprise an artificial neural network or other similar technology in one or more embodiments.

Regardless of whether context 110 is determined at step 103, in one or more embodiments, after being authenticated, the authorized user 106 then applies the wearable electronic device 107 to her self. This transfers the wearable electronic device 107 from an unworn to a worn state 111, which is shown at step 104. This step 104 can be performed in any number of ways.

If, for example, the wearable electronic device 107 is a smart watch, the authorized user 106 can transition the wearable electronic device 107 to the worn state 111 by placing the wearable electronic device 107 about the wrist. In the illustrative embodiment of FIG. 1, the authorized user 106 transitions the wearable electronic device 107 to the worn state 111 by attaching the wearable electronic device 107 to a piece of clothing or directly on skin like a wrist watch, which in this example is a jacket. If the wearable electronic device 107 were not wearable, e.g., if it were instead a smartphone, the authorized user 106 could transition the electronic device to a worn state 111 by placing it in a pocket, and so forth.

Thus, as shown at steps 101-104, in one or more embodiments a person is authenticated as the authorized user 106 of the wearable electronic device 107 the minute it is placed in the worn state 111. In one or more embodiments, the wearable electronic device 107 defaults to using a fingerprint sensor as the biometric sensor 108 when powering ON. Once authenticated, in one or more embodiments the wearable electronic device 107 monitors whether it is continuously attached to the authorized user 106 via one or more sensors such as touch sensors, accelerometers, imagers, voice sensors, and so forth. In other words, in one or more embodiments the authorized user wears the wearable electronic device 107 and then authenticates via a fingerprint sensor or other sensor after wearing the wearable electronic device 107.

In one or more embodiments, the authorized user 106 will remain authenticated by the wearable electronic device 107 so long as the wearable electronic device 107 is in the worn state 111. Embodiments of the disclosure contemplate that other authentication techniques to reauthenticate a person as the authorized user 106 of the wearable electronic device 107 can be used when the wearable electronic device 107 is transitioned to an unworn state, such as when it is removed from the jacket and placed on a table.

For instance, the biometric sensor 108 may transition to a voice recognition engine that authenticates by voice when the wearable electronic device 107 is placed on a table, and so forth. In one or more embodiments, only when the wearable electronic device 107 is transitioned out of the wearable state 111, e.g., is removed from the wrist or detached from the clothing and placed on a table, does the person need to be reauthorized as the authorized user 106 of the wearable electronic device 107. In one or more embodiments, where this occurs any tasks already underway in the wearable electronic device 107 can be allowed to finish without starting new ones. If, for example, the authorized user 106 was listening to music and takes the wearable electronic device 107 off, the song might be allowed to finish as it was authorized, while new songs or new controls will not be allowed without re-authentication.

Embodiments of the disclosure employ the wearable electronic device 107 to engage with companion electronic devices, e.g., companion electronic device 112 shown in FIG. 1 at step 104, to grant access to the companion electronic device 112, lock and unlock the companion electronic device 112, and actuate user interface devices of the companion electronic device 112 to consume information such as notifications, emails, data sharing, news briefs, reminders, and alerts. In one or more embodiments, the wearable electronic device 107 seamlessly communicates user credentials and grants user access to a proximately located companion electronic device 112 at which the gaze of the authorized user 106 is directed. As will be described in more detail below, engagement and content sharing preferences controlled by the wearable electronic device 107 can be stored in one or more engagement profiles stored in a memory of the wearable electronic device 107.

In one or more embodiments, when one or more processors of the wearable electronic device 107 identify 118 one or more companion electronic devices, e.g., companion electronic device 112, operating within a wireless communication radius 113 of the wearable electronic device 107, and thereafter one or more sensors of the wearable electronic device 107 identify the wearable electronic device 107 is within a predefined distance 114 of a companion electronic device 112, a wireless communication circuit of the wearable electronic device 107 responsive to the one or more processors of the wearable electronic device 107 deliver an authentication credential 115 to the companion electronic device 112. In one or more embodiments, the authentication credential 115 authenticates the authorized user 106 of the wearable electronic device 107 as the authorized user 106 of the companion electronic device 112. In one or more embodiments, the authentication credential 115 unlocks the companion electronic device 112 and renders it ready for use.

Unless the authorized user 106 just happens to be looking at the companion electronic device 112 when the authentication credential 115 is delivered to the companion electronic device 112, in one or more embodiments the user interface components, e.g., the display, the audio output devices, and so forth, initially remain OFF. Thus, despite being authenticated as the authorized user 106 of the wearable electronic device 107, in one or more embodiments the user interface components of the companion electronic device 112 initially remain in an OFF state.

One or more sensors of the wearable electronic device 107 thereafter detect a gaze 116 of the authorized user 106 being directed at the companion electronic device 112. In one or more embodiments, in response to the one or more sensors detecting that the gaze 116 of the authorized user 106 is directed at the companion electronic device 112, the wireless communication circuit of the wearable electronic device 107 delivers an actuation command 117 to the companion electronic device 112. In one or more embodiments, the actuation command 117 causes a user interface component to become active. Illustrating by example, in one embodiment the delivery of the actuation command 117 by the wireless communication circuit of the wearable electronic device 107 to the companion electronic device may cause the display to transition to an ON state and begin presenting information to the authorized user 106.

Accordingly, when the wearable electronic device 107 comes within a predefined distance 114 of a companion electronic device 112, be it a computer, vehicle, smart door, smartphone, voice assistant device, smart speaker, smart light, smart thermostat, smart appliance, smart lock, or other companion electronic device, and one or more processors of the wearable electronic device 107 determine that the authorized user 106 is looking at a particular companion electronic device 112, seamless access to engage user interface devices of the companion electronic device 112 is granted by the wearable electronic device 107. When the companion electronic device 112 is in the right location for interaction, i.e., in front of their eyes and within their gaze 116, rather than to the right, left, or behind, the wearable electronic device 107 grants seamless access to consume information delivered by the user interface devices of the companion electronic device 112.

Step 105 details one explanatory process indicating how this can occur. One or more processors of the wearable electronic device 107 identify 118 one or more companion electronic devices operating within a wireless communication radius 113 of the wearable electronic device 107. The one or more processors of the wearable electronic device 107 can identify 118 the one or more companion electronic devices by communicating a beacon 121 in one or more embodiments. This identification can occur in the opposite direction as well, with the companion electronic device 112 transmitting a beacon to the wearable electronic device 107. In one or more embodiments, it is presumed that both the wearable electronic device 107 and any companion electronic devices operating within the wireless communication radius 113 are owned by the authorized user 106 such that any necessary software can be downloaded into the wearable electronic device 107 and the companion electronic devices to enable this functionality.

In one or more embodiments, any companion electronic device 112 operating within the wireless communication radius 113 transmits 119 its device type identifier 120 in response to a request 123 from the wearable electronic device 107 for the companion electronic device 112 to identify itself.

In other embodiments, the companion electronic device 112 continuously transmits 119 its device type identifier 120, with the device type identifier 120 being received by the wearable electronic device 107 when the wearable electronic device 107 and companion electronic device 112 are both operating within the wireless communication radius 113. In one or more embodiments, the device type identifier 120 is a dummy code that is unsecure. For instance, a simple two or three digit code can identify whether the companion electronic device 112 is a car, a doorbell, a smartphone, a computer, and so forth.

In still other embodiments, the wearable electronic device 107 can deliver a beacon 121 when a companion electronic device 112 is identified as being within the wireless communication radius 113. When the companion electronic device 112 receives the beacon 121, it can transmit 119 its device type identifier 120 back to the wearable electronic device 107.

In still other embodiments, the wearable electronic device 107 can identify whether a companion electronic device 112 is operating within the wireless communication radius 113 using an imager. One or more processors of the wearable electronic device 107 can perform image analysis on images captured by the imager to identify the device type identifier 120 of each companion electronic device 112. Other techniques for identifying the companion electronic devices operating within the wireless communication radius 113 will be obvious to those of ordinary skill in the art having the benefit of this disclosure.

In one or more embodiments, beacon technology in the wearable electronic device is adaptively selected based on device type for best engagement. Accordingly, in one or more embodiments one or more processors of the wearable electronic device can adaptively select between delivering infrared signals, ultrasound signals, or radio frequency signals. The beacon technology of the wearable electronic device can also be adaptively selected based upon device type and background environment, e.g., sun, noise, etc., for best engagement with the companion electronic device.

In one or more embodiments, the companion electronic device 112 continuously broadcasts its device type identifier 120 over a Bluetooth or other wireless link following software upgrades. In one or more embodiments, the companion electronic device 112 continuously broadcasts its device type identifier 120 over Bluetooth or another wireless link in response to a recent wearable beacon presence/detection.

In one or more embodiments, the wearable electronic device 107 comprises a memory that is operable with its one or more processors. In one or more embodiments, the memory stores one or more engagement profiles corresponding to one or more companion electronic devices with which the wearable electronic device 107 is configured to interact.

In one or more embodiments, each engagement profile defines the predefined distance 114 within which a companion electronic device must be for the authentication credential 115 to be delivered. Embodiments of the disclosure contemplate that the authorized user 106 can be farther from a widescreen television, with its big display, than from a smartphone, for example, when consuming content. Accordingly, the engagement profile may require that the predefined distance 114 for a smartphone be only a few feet, while the predefined distance 114 associated with a widescreen television may be a few yards, and so forth. The predefined distance 114 for a vehicle may be ten to twenty feet, while the predefined distance 114 for a laptop computer may be two to three feet. The predefined distance from 114 a smart doorbell may be around three feet, and so forth.

Embodiments of the disclosure contemplate that when the companion electronic device 112 transmits its device type identifier 120 to the wearable electronic device 107, the wearable electronic device 107 accesses the engagement profile to determine what the predefined distance 114 for the companion electronic device 112 is and, optionally, what type of information or access is required. Thus, in one or more embodiments, the one or more processors of the wearable electronic device 107, upon identifying the companion electronic device 112, then retrieve 122 the predefined distance 114 from the memory. The engagement profile can contain other information as well, such as preferred applications or content for presentation by the companion electronic device 112 when user interface devices of the companion electronic device 112 become active, what level of access and sharing is required per device type identifier 120, and so forth.

One or more sensors of the wearable electronic device 107 then detect 124 the distance between the companion electronic device 112 and the wearable electronic device 107. This can be done in a variety of ways. In one or more embodiments, the one or more sensors of the wearable electronic device 107 can detect 124 the distance between the companion electronic device 112 and the wearable electronic device 107 using a received signal strength indicator (RSSI) measured by the wireless communication circuit. In another embodiment, the one or more processors of the wearable electronic device 107 can perform image analysis on images captured by an imager to identify the distance between the wearable electronic device 107 and the companion electronic device 112. In other embodiments, sonar or proximity detectors that emit infrared light from a transmitter, which is reflected from the companion electronic device to a receiver, can be used to determine the distance between the wearable electronic device 107 and the companion electronic device 112. Other techniques for determining the distance between the wearable electronic device 107 and the companion electronic device 112 will be obvious to those of ordinary skill in the art having the benefit of this disclosure.

The one or more sensors of the wearable electronic device 107 then identify 125 the wearable electronic device 107 being within the predefined distance 114 of the companion electronic device 112. In one or more embodiments, the wearable electronic device 107 communicates user credentials to nearby devices and instructs devices to perform certain tasks when distance and orientations are met. When the predefined distance 114 between the wearable electronic device 107 and the companion electronic device 112 is reached, the wireless communication circuit of the wearable electronic device 107 delivers 126 the authentication credential 115 to the companion electronic device 112. In one or more embodiments, the authentication credential 115 authenticates the authorized user 106 to the companion electronic device 112, and optionally causes the companion electronic device 112 to transition from a locked state to an unlocked state. Examples of authentication credentials include user names, passwords, personal identification numbers, and so forth.

The one or more sensors of the wearable electronic device 107 thereafter detect a gaze 116 of the authorized user 106 of the wearable electronic device 107 being directed at the companion electronic device 112. This can occur in a variety of ways. In one embodiment where the companion electronic device 112 is equipped with an imager 129, as is the case in FIG. 1, one or more processors of the wearable electronic device 107 transmit 127 a control operation command 128 to the companion electronic device 112 causing the imager 129 to actuate. The imager 129 of the companion electronic device 112 then captures 130 one or more images 131 of the authorized user 106 and transmits 132 the one or more images 131 to the wearable electronic device 107. The one or more processors of the wearable electronic device 107 then analyze 133 the one or more images 131 to determine whether the gaze 116 of the authorized user 106 is directed at the companion electronic device 112.

In another embodiment, the wearable electronic device 107 is equipped with an imager. Where so equipped, the one or more processors of the wearable electronic device 107 cause the imager to capture one or more images of the authorized user 106 and the companion electronic device 112 and use image analysis to determine whether the gaze 116 of the authorized user 106 is directed at the companion electronic device 112.

In still another embodiments, the wireless communication circuit of the wearable electronic device 107 has a narrow beam transmitter and is very directive. This narrow beam transmitter, receiver, or transceiver provides directionality and can transmit one or more of infrared, ultrasound, and/or radio frequency signals in one or more embodiments.

In one or more embodiments, beacon technology of the narrow beam transmitter in the wearable electronic device 107 is adaptively selected based on device type for best engagement with the companion electronic device 112. Accordingly, in one or more embodiments one or more processors of the wearable electronic device 107 can adaptively select between delivering infrared signals, ultrasound signals, or radio frequency signals. The beacon technology of the wearable electronic device 107 can also be adaptively selected based upon device type and background environment, e.g., sun, noise, etc., for best engagement with the companion electronic device 112.

Where the wearable electronic device 107 includes a narrow beam transmitter that is very directive, the one or more processors of the wearable electronic device 107 conclude that the authorized user 106 has their gaze 116 directed at the companion electronic device 112 when the directive, narrow beam is in communication with the companion electronic device 112, i.e., when the authorized user 106 has pointed an emitter of the wireless communication circuit of the wearable electronic device 107 directly at the companion electronic device 112.

In still other embodiments, the companion electronic device 112 has a narrow beam transmitter while the wearable electronic device 107 has a narrow beam, and thus very directive, antenna or receiver. As with the narrow beam transmitter, the antenna or receiver of the wearable electronic device 107 can receive one or more of infrared signals, ultrasound signals, or radio frequency signals.

In one or more embodiments, beacon technology in the wearable electronic device 107 is adaptively selected based on device type for best engagement. Accordingly, in one or more embodiments one or more processors of the wearable electronic device 107 can adaptively select between receiving infrared signals, ultrasound signals, or radio frequency signals. The beacon technology of the wearable electronic device 107 can also be adaptively selected based upon device type and background environment, e.g., sun, noise, etc., for best engagement with the companion electronic device 112.

Where the wearable electronic device 107 includes a narrow beam antenna or receiver, the one or more processors of the wearable electronic device 107 conclude that the authorized user 106 has their gaze 116 directed at the companion electronic device 112 when the directive, narrow beam antenna is receiving signals from the companion electronic device 112, i.e., when the authorized user 106 has pointed the receiver of the wireless communication circuit of the wearable electronic device 107 directly at the companion electronic device 112.

In still other embodiments, where the wearable electronic device 107 is configured as a pair of smart glasses, an imager of the smart glasses can determine exactly where the gaze 116 is directed. Other techniques for determining whether the gaze 116 of the authorized user 106 is directed at the companion electronic device 112 will be obvious to those of ordinary skill in the art having the benefit of this disclosure.

When the one or more sensors of the wearable electronic device 107 determine that the gaze 116 of the authorized user 106 is directed at the companion electronic device 112, in one or more embodiments the wireless communication circuit of the wearable electronic device 107 delivers 134 the actuation command 117 to the companion electronic device 112. In one or more embodiments, the actuation command 117 is used to actuate user interface components of the companion electronic device 112, control the presentation or delivery of content by the user interface components of the companion electronic device 112, or perform other control operations. Illustrating by example, the actuation command 117 can cause the display of the companion electronic device 112 to become active and to start presenting content, such as emails data sharing, news briefs, notifications, reminders, and alerts.

The actuation command 117 can take a number of different forms. In its most basic form, the actuation command 117 comprises an electronic message commanding or authorizing the companion electronic device to take a particular action. Examples of such actions include turning ON the display, selecting content for delivery or presentation, and so forth. The actions will vary based upon the application and the type of companion electronic device. In other embodiments, the actuation command 117 can comprise keys or tokens that cause the companion electronic device 112 to perform a particular action, such as launching a particular application or presenting a particular type of information on its display. Other types of actuation commands 117 will be obvious to those of ordinary art having the benefit of this disclosure.

In one or more embodiments, the engagement profiles stored within the memory of the wearable electronic device 107 further define an operating mode for the companion electronic device 112 to enter upon receipt of the actuation command 117. For example, the authorized user 106 may define in the engagement profile for the companion electronic device 112 that when the display of the companion electronic device 112 is actuated, one or more processors of the companion electronic device 112 should actuate an email application and present unread emails on the display of the companion electronic device 112. Alternatively, the engagement profile may dictate that the one or more processors of the companion electronic device 112 present unread notifications, such as news alerts, missed text messages, and missed calls on the display of the companion electronic device 112 when the display is actuated, and so forth.

In sum, in one or more embodiments once the authentication credential 115 and the actuation command 117 are delivered to the companion electronic device 112, the authorized user 106 is granted access to the companion electronic device 112 and content sharing is enabled in accordance with the user defined settings of the engagement profile. While the engagement profiles can be stored in local memory of the wearable electronic device 107 in one or more embodiments, in other embodiments they can be stored in a cloud. Accessing the cloud profile of the authorized user 106 can then determine the preferences and accounts of the authorized user 106.

In one or more embodiments, this access comes in the form of a "two level" process. The first is just proximity, the second is gaze. In one or more embodiments, both are needed to unlock seamlessly. Proximity is used to transfer the authentication credential 115 to transition the companion electronic device 112 to an unlocked state, while "glance/attention" identified by gaze 116 direction is used to transfer the actuation command 117 for content delivery until a user defined timeout occurs. In one or more embodiments directionality is needed to keep the display (or other user interface device) ON, while proximity is used to keep the companion electronic device 112 unlocked.

Embodiments of the disclosure contemplate that a person may unlock a companion electronic device 112, such as a smartphone, over one hundred times per day, every day, to check the time, to check for new messages, to check for navigation information, to review articles, and to make voice and text communications. Advantageously, using the wearable electronic device 107 to transmit the authentication credential 115 and the actuation command 117 to seamlessly unlock and actuate the user interface devices of the companion electronic device bypasses the steps of having to physically manipulate the companion electronic device 112 with each unlocking process.

Figure 2:
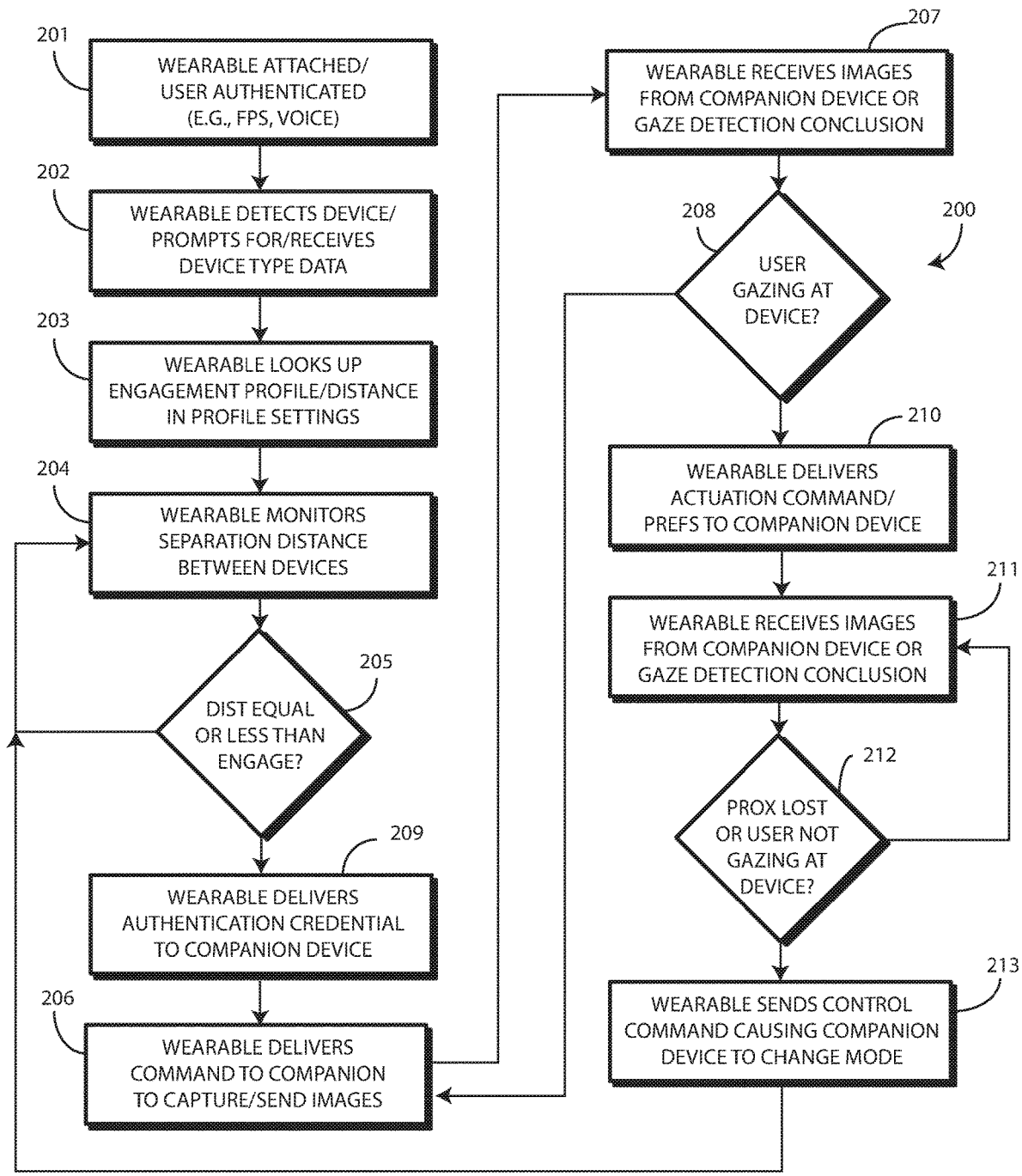
FIG. 2 illustrates another explanatory method for an electronic device in accordance with one or more embodiments of the disclosure.

Turning now to FIG. 2, illustrated therein is one explanatory method 200 in accordance with one or more embodiments of the disclosure. Beginning at step 201, in one or more embodiments a biometric sensor of a wearable electronic device receives biometric input and, where the biometric input matches authentication criteria, authenticates the person as an authorized user of the wearable electronic device.

In one or more embodiments, step 201 also determines whether the wearable electronic device is in a worn state. This can be done with skin sensors, garment attachment sensors, wearability sensor, imager, temperature sensor, or other type of sensor capable of indicating whether the wearable electronic device is being worn. Other techniques for determining whether the wearable electronic device is being worn will be obvious to those of ordinary skill in the art having the benefit of this disclosure.

At step 202, one or more processors of the wearable electronic device, which can be operable with one or more sensors and a wireless communication circuit, identify at least one companion electronic device operating within a wireless communication radius of the wearable electronic device. In one or more embodiments, a wireless communication circuit of the wearable electronic device prompts the companion electronic device for a device type identifier at step 202. In one or more embodiments, the wireless communication circuit of the wearable electronic device receives a device type identifier from a companion electronic device at step 202.

Figure 3:
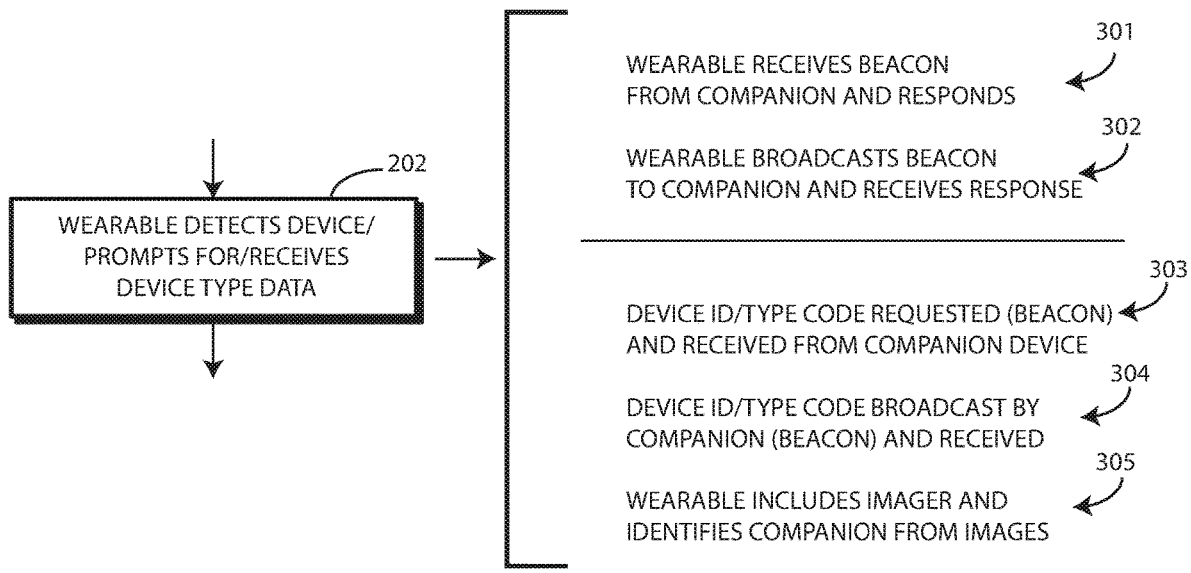
FIG. 3 illustrates one or more method steps in accordance with one or more embodiments of the disclosure.

Turning briefly to FIG. 3, illustrated therein are various ways that step 202 can be performed. In one or more embodiments, at step 301 the wearable electronic device receives a beacon broadcast from the companion electronic device and delivers a response to identify the companion electronic device operating within a wireless communication radius of the wearable electronic device. This beacon can be any of an infrared beacon, an ultrasound beacon, or a radio frequency beacon.

In one or more embodiments, beacon technology in the wearable electronic device is adaptively selected based on device type for best engagement. Accordingly, in one or more embodiments one or more processors of the wearable electronic device can adaptively select between receiving infrared signals, ultrasound signals, or radio frequency signals. The beacon technology of the wearable electronic device can also be adaptively selected based upon device type and background environment, e.g., sun, noise, etc., for best engagement with the companion electronic device.

In other embodiments, step 302 comprises the wearable electronic device broadcasting a beacon to the companion electronic device, which delivers a response to identify the companion electronic device operating within a wireless communication radius of the wearable electronic device. This beacon can be any of an infrared beacon, an ultrasound beacon, or a radio frequency beacon.

In one or more embodiments, beacon technology in the wearable electronic device is adaptively selected based on device type for best engagement. Accordingly, in one or more embodiments one or more processors of the wearable electronic device can adaptively select between broadcasting infrared signals, ultrasound signals, or radio frequency signals. The beacon technology of the wearable electronic device can also be adaptively selected based upon device type and background environment, e.g., sun, noise, etc., for best engagement with the companion electronic device.

At step 303, the wearable electronic device can request the device type identifier from the companion electronic device. In one or more embodiments, this can occur when the wireless communication circuit of the wearable electronic device delivers a device identification request command directly to the companion electronic device. In other embodiments, this can occur when the wireless communication circuit of the wearable electronic device broadcasts a beacon that includes a general device type identifier request. At step 304, the companion electronic device can simply broadcast its device type in the form of a beacon.

At step 305, the wearable electronic device can include an imager that captures images of the companion electronic device. One or more processors of the wearable electronic device can then perform image analysis to identify the companion electronic device from the one or more captured images. Other techniques for the wearable electronic device to determine the identity of the companion electronic device will be obvious to those of ordinary skill in the art having the benefit of this disclosure. Thus, in one or more embodiments step 305 comprises capturing, by an imager of the wearable electronic device, one or more images of the companion electronic device, and determining, by the one or more processors, a device type identifier for the companion electronic device from the one or more images.

Turning now back to FIG. 2, in one or more embodiments the wearable electronic device has access one or more engagement profiles corresponding to one or more companion electronic device types. In one or more embodiments, the one or more engagement profiles correspond to the types of companion electronic devices on a one-to-one basis, with one engagement profile corresponding to one type of companion electronic device, another engagement profile corresponding to another companion electronic device, and so forth. The one or more engagement profiles can be stored locally in a memory of the wearable electronic device in one embodiment. In other embodiments, the one or more engagement profiles can be stored in the cloud and retrieved by one or more processors of the wearable electronic device as necessary.

At step 203, one or more processors of the wearable electronic device retrieve, from a memory of the wearable electronic device or from the cloud, an engagement profile for the companion electronic device as a function of the device type identifier received at step 202. In one or more embodiments, the engagement profile identifies both a predefined distance at which the wireless communication circuit of the wearable electronic device should transmit the authentication credential and at least one user preference identifying a type of content to present on the display of the companion electronic device when the wearable electronic device transmits the actuation command.

Figure 4:
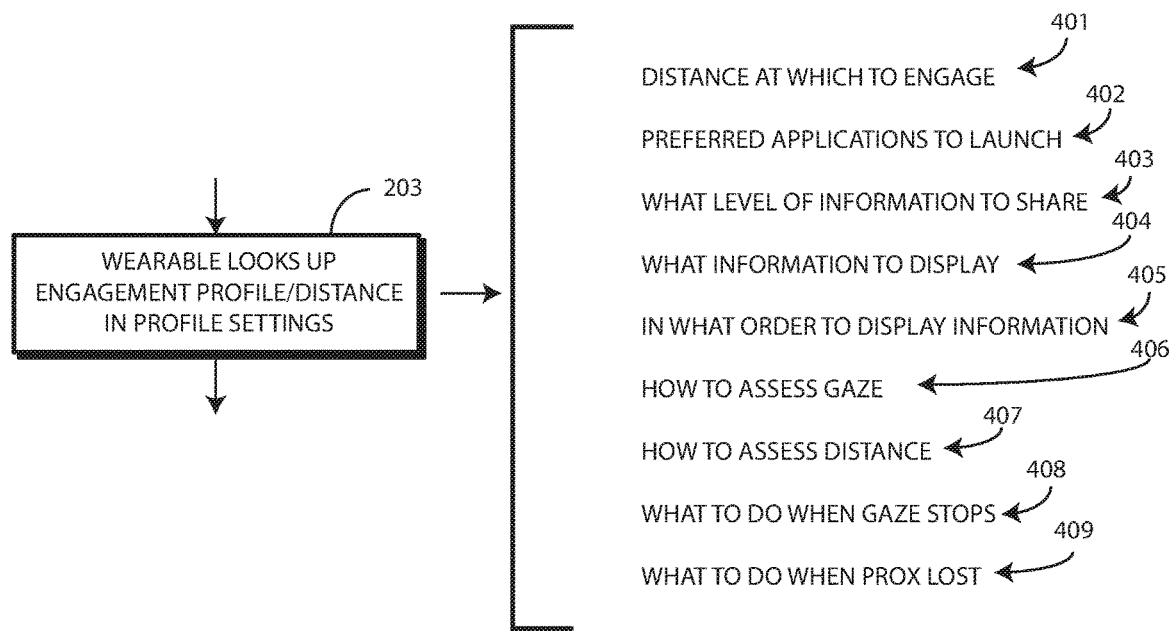
FIG. 4 illustrates one or more method steps in accordance with one or more embodiments of the disclosure.

Turning briefly to FIG. 4, illustrated therein are examples of types of information that can be stored in, and retrieved from, an engagement profile at step 203. Information 401 comprises a predefined distance at which the wireless communication circuit of the wearable electronic device should transmit the authentication credential to the companion electronic device based upon the device type identifier of the companion electronic device. Information 402 comprises a preferred set of applications the companion electronic device should launch upon receipt of an actuation command from the wearable electronic device. These preferred applications can optionally be user defined by adjusting one or more settings when creating each engagement profile.

Information 403 comprises what level of information to share in response to a given combination of authentication credential and actuation command received from the wearable electronic device. If, for example, a companion electronic device is a family computer, embodiments of the disclosure contemplate that multiple users may use, and have data stored in, the computer. Accordingly, a combination of authentication credential and actuation command received from a wearable electronic device authenticating the wife as the authorized user may result in different content being presented than would combination of authentication credential and actuation command received from a wearable electronic device authenticating the husband as the authorized user, and so forth.

Information 404 comprises what information to display. Some users may want to see email, while others want to see the weather. Some may want to see news notifications, while others want to see missed calls. In one or more embodiments, the information 404 automatically presented by the companion electronic device upon receipt of the actuation command from the wearable electronic device can be defined in the engagement profile as a function of device type identifier.

Information 405 comprises in what order the companion electronic device should present information in response to receiving the actuation command from the wearable electronic device. Some users may prefer to see emails first, while others may prefer social media posts first.

Information 406 comprises how to determine gaze as a function of device type. As noted above with reference to FIG. 1, in some embodiments the imager of the companion electronic device captures images and transmits them to the wearable electronic device, where one or more processors of the wearable electronic device analyze the images to determine whether the gaze of an authorized user is directed at the companion electronic device. In other embodiments, the imager of the companion electronic device captures images of the authorized user and analyzes them to determine whether the gaze of the authorized user is directed at the companion electronic device, transmitting its conclusion to the wearable electronic device.

In other embodiments, an imager of the wearable electronic device captures images of one or more of the authorized user and the companion electronic device, with one or more processors analyzing those images to determine whether the gaze of the authorized user is directed at the companion electronic device. In still other embodiments, the wearable electronic device includes a narrow beam transmitter, with gaze being concluded when the narrow beam transmitter is in communication with the companion electronic device. In other embodiments, the wearable electronic device has a narrow beam antenna, with gaze being concluded when the narrow beam antenna receives signals from the companion electronic device. These mechanisms for determining gaze can be classified by device type identifier and stored in engagement profiles.

Information 407 comprises how to determine distance as a function of device type identifier. Some companion electronic devices may allow for an assessment of distance through RSSI measurements, while others may require image analysis of images captured by an imager of the wearable electronic device, an imager of the companion electronic device, or combinations thereof.

Information 408 comprises what to do when the gaze is no longer directed at the companion electronic device. In one or more embodiments, when one or more sensors of the wearable electronic device identify that the gaze of the authorized user is directed away from the companion electronic device, a wireless communication circuit delivers a deactuation command to the companion electronic device causing one or more user interface devices to cease presenting content. For example, one illustrative deactuation command can cause the display of the companion electronic device to cease presenting email, text messages, or other content. These instructions can be codified in the engagement profiles in one or more embodiments.

Information 409 comprises what to do when the wearable electronic device passes outside the predefined distance of the companion electronic device. In one or more embodiments, where one or more sensors of the wearable electronic device identify both that the gaze of the authorized user is directed away from the companion electronic device and the wearable electronic device is outside the predefined distance of the companion electronic device, a wireless communication circuit of the wearable electronic device transmits a deactuation credential to the companion electronic device. In one or more embodiments, the deactuation credential causes the companion electronic device to enter a locked mode of operation.

Information 410 comprises what to do when the wearable electronic device is no longer in a worn state, i.e., when the authorized user is no longer wearing it. In one or more embodiments, the wireless communication circuit of the wearable electronic device is enabled to transmit the authentication credential and the actuation command only when one or more sensors of the wearable electronic device identify that the authorized user is wearing the wearable electronic device. In one or more embodiments, when the wearable electronic device is no longer being worn, the authorized user must reauthenticate with the wearable electronic device prior to any authentication credential or actuation command being transmitted again.

Turning now back to FIG. 2, at step 204 the wearable electronic device monitors, by one or more processors of the wearable electronic device that are operable with one or more sensors and a wireless communication circuit of the wearable electronic device, a distance between the companion electronic device and the wearable electronic device. Decision 205 identifies, by the one or more processors, whether the companion electronic device is operating within a predefined distance of the wearable electronic device. In one or more embodiments, decision 205 comprises one or more sensors of the wearable electronic device identifying the wearable electronic device being within a predefined distance of a companion electronic device identified by the engagement profile retrieved at step 203.

At step 209 a wireless communication circuit responsive to the one or more processors of the wearable electronic device delivers an authentication credential to the companion electronic device. In one or more embodiments the authentication credential causes the companion electronic device to transition from a locked mode of operation to an unlocked mode of operation. In the unlocked mode of operation, no additional authentication credentials are required to access and use the companion electronic device in one or more embodiments.

In one or more embodiments, step 209 also comprises transmitting information from the engagement profile that informs the companion electronic device how to operate when an actuation command is later received. For example, in one or more embodiments the engagement profile identifies a predefined operating mode for the companion electronic device. This predefined operating mode might be a music playing mode or a video sharing mode or an email sharing mode or an alert presentation mode or a news presentation mode or other operating mode. In one or more embodiments step 209 comprises the one or more processors of the wearable electronic device identifying the predefined operating mode from the engagement profile and transmitting the predefined operating mode to the companion electronic device. When an actuation command is later received at step 210, the actuation command causes the companion electronic device to enter the predefined operating mode in one or more embodiments.

Alternatively, in other embodiments the predefined operating mode can be transmitted with the actuation command at step 210.

As shown in FIG. 2, in one or more embodiments this step 209 occurs between decision 205 and step 206. Said differently, in one or more embodiments where step 204 and decision 205 comprises one or more processors of the wearable electronic device identifying a companion electronic device operating within a wireless communication radius of the wearable electronic device, and where step 203 optionally includes retrieving from the memory an engagement profile as a function of a device type of the companion electronic device, step 209 occurs in response to the one or more sensors identifying that the wearable electronic device is within the predefined distance of the companion electronic device, and occurs before step 206.

Alternatively, in other embodiments step 209 can occur between decision 208 and step 210. Said differently, in one or more embodiments where step 204 and decision 205 comprises one or more processors of the wearable electronic device identifying a companion electronic device operating within a wireless communication radius of the wearable electronic device, and where step 203 optionally includes retrieving from the memory an engagement profile as a function of a device type of the companion electronic device, and where step 207 and decision 208 comprise the one or more sensors identifying that a gaze of an authorized user of the wearable electronic device are directed at the companion electronic device, step 209 occurs in response to the one or more sensors identifying that the wearable electronic device is within the predefined distance of the companion electronic device and upon identifying that the gaze of the authorized user is directed at the companion electronic device.

Regardless of when step 209 is performed, where the companion electronic device is operating within the predefined distance the method 200 next turns to determining whether the authorized user is gazing toward the companion electronic device. This can occur in a variety of ways. As shown in FIG. 2, in one or more embodiments step 206 can comprise the one or more processors of the wearable electronic device causing the wireless communication circuit to transmit a control operation command causing an imager of the companion electronic device to capture one or more images.

Figure 5:
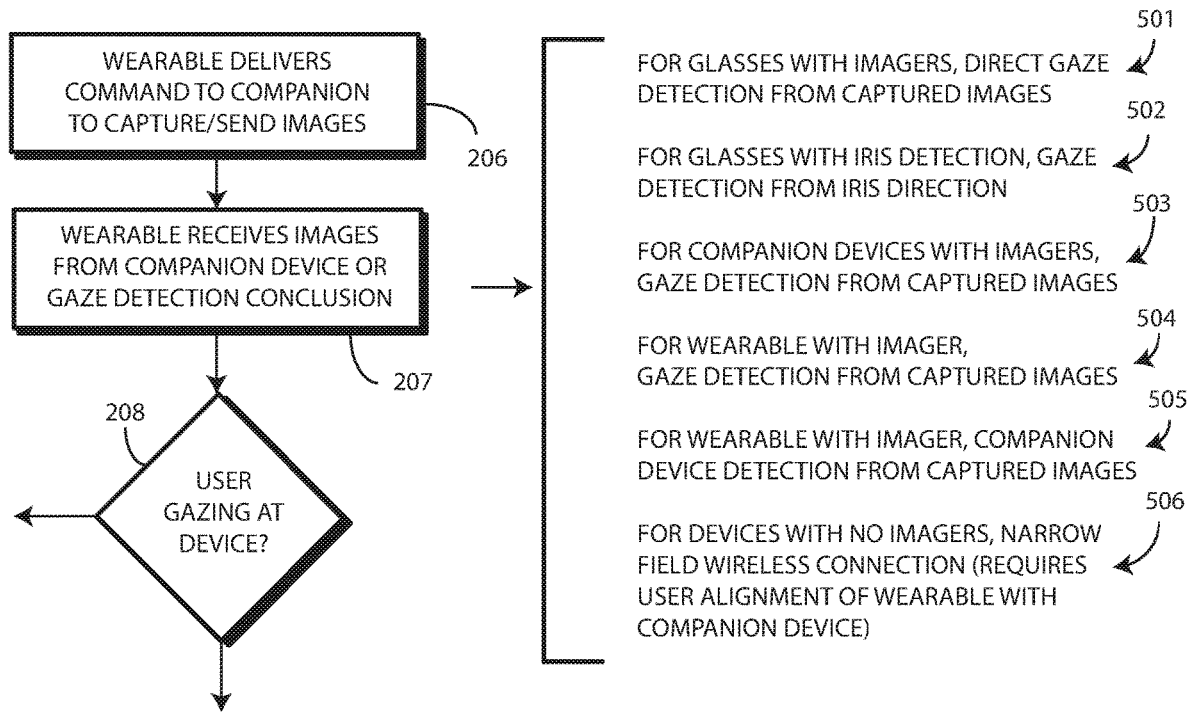
FIG. 5 illustrates one or more method steps in accordance with one or more embodiments of the disclosure.

Step 207 can then comprise the one or more processors of the wearable electronic device either receiving those images to determine whether the gaze of the authorized user is directed toward the companion electronic device, or alternatively can comprise the one or more processors of the wearable electronic device receiving a conclusion from one or more processors of the companion electronic device, based upon another image analysis, as to whether the gaze of the authorized user is directed at the companion electronic device. Decision 208 determines, by one or more processors of the wearable electronic device, whether the gaze of the authorized user of the wearable electronic device is upon, or directed upon, the companion electronic device. Determination of gaze could be performed by both devices each from its own perspective when they are within range and sharing credentials Turning briefly to FIG. 5, illustrated therein are various other ways in which this can occur. At step 501, the wearable electronic device is configured as a pair of smart glasses.

Where so configured, an imager of the smart glasses can determine exactly where the gaze is directed by capturing images of what the wearer is viewing.

At step 502, the wearable electronic device is also configured as a pair of smart glasses. However, at step 502 the smart glasses also include an iris detector. At step 502, the iris detector determines a directional orientation of the wearer's gaze by determining a directional orientation of the iris, which allows for an inferential determination of the directional orientation of the pupil.

At step 503, the companion electronic device is equipped with an imager. Accordingly, the gaze detection process can proceed substantially as described above with reference to FIG. 2. To wit, at step 503 one or more processors of the wearable electronic device transmit a control operation command to the companion electronic device causing the imager of the companion electronic device to actuate.

At step 503, the imager of the companion electronic device then captures one or more images of the authorized user. In one or more embodiments, one or more processors of the companion electronic device perform image analysis on the captured images to determine whether the gaze of the authorized user is upon, or directed upon, the companion electronic device. In one or more embodiments, step 503 comprises the one or more processors of the companion electronic device transmitting a conclusion as to whether the gaze of the authorized user is upon, or directed upon, the companion electronic device to the wearable electronic device.

In another embodiment, the one or more processors of the companion electronic device transmit captured images to the wearable electronic device at step 503. One or more processors of the wearable electronic device then perform image analysis on the received, captured images to determine whether the gaze of the authorized user is upon, or directed upon, the companion electronic device.

In still another embodiment, the one or more processors of the companion electronic device can perform image analysis on the captured images to determine whether the gaze of the authorized user is upon, or directed upon, the companion electronic device in addition to transmitting the captured images to the wearable electronic device at step 503. The one or more processors of the wearable electronic device then perform image analysis on the received, captured images to determine whether the gaze of the authorized user is upon, or directed upon, the companion electronic device, and compare the conclusion to that received from the companion electronic device.

At step 504, the wearable electronic device is equipped with an imager. Where so equipped, the one or more processors of the wearable electronic device cause the imager to capture one or more images of the authorized user and the companion electronic device. The one or more processors of the wearable electronic device then use image analysis to determine whether the gaze of the authorized user is directed at the companion electronic device.

At step 505, signals are used instead of images. In one or more embodiments, the wireless communication circuit of the wearable electronic device has a narrow beam transmitter that is very directive at step 505. This narrow beam transmitter can transmit one or more of infrared, ultrasound, and/or radio frequency signals in one or more embodiments.

In one or more embodiments, beacon technology of the narrow beam transmitter in the wearable electronic device is adaptively selected at step 505 based on device type for best engagement with the companion electronic device. Where the wearable electronic device includes a narrow beam transmitter that is very directive, the one or more processors of the wearable electronic device conclude that the authorized user has their gaze directed at the companion electronic device when the directive, narrow beam is in communication with the companion electronic device, i.e., when the authorized user has pointed an emitter of the wireless communication circuit of the wearable electronic device directly at the companion electronic device.

In one or more embodiments, the companion electronic device can be shaped to have a pointer surface so that the authorized user understands where the directive beam is oriented. For example, in one or more embodiments the companion electronic device is shaped like a pen or includes a protrusion or is shaped like a pointer finger or has a surface from which the directive, narrow beam emanates. Accordingly, the authorized user can direct the pointer surface toward the companion electronic device such that the narrow beam will be in communication with the companion electronic device.

In still other embodiments, the companion electronic device has a narrow beam transmitter at step 505 while the wearable electronic device has a narrow beam, and thus very directive, antenna or receiver. As with the narrow beam transmitter, the antenna or receiver of the wearable electronic device can receive one or more of infrared signals, ultrasound signals, or radio frequency signals. Where the wearable electronic device includes a narrow beam antenna or receiver, the one or more processors of the wearable electronic device conclude that the authorized user has their gaze directed at the companion electronic device when the directive, narrow beam antenna is receiving signals from the companion electronic device, i.e., when the authorized user has pointed the receiver of the wireless communication circuit of the wearable electronic device directly at the companion electronic device. As with the narrow beam transmitter, the wearable electronic device can be configured with a pointer surface such that the authorized user can direct the pointer surface toward the companion electronic device to know in which direction the narrow beam antenna is oriented.

Turning now back to FIG. 2, when the one or more processors of the wearable electronic device identify a companion electronic device operating within a wireless communication radius of the wearable electronic device at step 202, and where the one or more processors optionally retrieve from the memory an engagement profile as a function of the device type of the companion electronic device at step 203, and where one or more sensors of the wearable electronic device identify the wearable electronic device being within a predefined distance of the companion electronic device identified by the engagement profile at decision 205, and where the one or more sensors identify that a gaze of an authorized user of the wearable electronic device being directed at the companion electronic device at decision 208, step 210 comprises delivering an actuation command upon identifying that the gaze of the authorized user is directed at the companion electronic device in one or more embodiments.

In one or more embodiments, the actuation command delivered at step 210 instructs a user interface component of the companion electronic device to enter an active mode of operation. For instance, the actuation command delivered at step 210 can cause a display of the companion electronic device to become active and to present information to the authorized user. In another embodiment, the actuation command delivered at step 210 can cause an audio output device of the companion electronic device to begin delivering audio output to the authorized user. In still another embodiment, the actuation command delivered at step 210 can cause one or more microphones of the companion electronic device to become active and to begin receiving voice input from the authorized user. In still another embodiment, the actuation command delivered at step 210 can cause one or more touch sensitive surfaces to become active to receive touch input. Of course, combinations of these actions can be caused by delivery of the actuation command at step 210. Moreover, other actions caused by the delivery of the actuation command at step 210 will be obvious to those of ordinary skill in the art having the benefit of this disclosure.

In one or more embodiments, step 210 comprises the one or more processors of the wearable electronic device causing the wireless communication circuit of the wearable electronic device to transmit, with the actuation command, at least one user preference identifying a type of content to present on a display of the companion electronic device. If, for example, a particular authorized user prefers to read email when the display becomes active in response to the actuation command being transmitted at step 210, in one or more embodiments this user preference identifying email as the content to present on the display of the companion electronic device can be transmitted at step 210 as well. By contrast, if the authorized user prefers to review social media posts when the display becomes active in response to the actuation command being transmitted at step 210, in one or more embodiments this user preference identifying a social media application as the content to present on the display of the companion electronic device can be transmitted at step 210, and so forth.

While the one or more user interface components of the companion electronic device are active in response to receipt of the actuation command at step 210, the method 200 continues to monitor the gaze of the authorized user to ensure that it remains directed at the companion electronic device. Step 211 monitors the gaze, and can occur as described above with reference to steps 206, 207, or FIG. 5. Decision 212 then determines whether there is a cessation of the gaze of the authorized user of the wearable electronic device upon the companion electronic device.

Where there is no cessation of the gaze of the authorized user of the wearable electronic device upon the companion electronic device, the one or more user interface components of the companion electronic device remain active. However, in one or more embodiments step 213 comprises, whenever a cessation of the gaze of the authorized user of the wearable electronic device upon the companion electronic device occurs, the wireless communication circuit transmitting a deactuation command to the companion electronic device.

In one or more embodiments, the deactuation command causes the one or more user interface components of the companion electronic device to cease presenting content. For example, if the display of the companion electronic device had been presenting email updated in response to receiving the actuation command sent at step 209, in one or more embodiments receipt of the deactuation command sent at step 213 causes the display of the companion electronic device to cease presenting content.

In one or more embodiments, decision 212 also determines whether the companion electronic device moves beyond the predefined distance from the wearable electronic device. In one or more embodiments, one or more sensors of the wearable electronic device determine at decision 212 whether the companion electronic device has moved beyond the predefined distance from the wearable electronic device.

Where the companion electronic device has not moved beyond the predefined distance from the wearable electronic device, the companion electronic device remains in an unlocked state. While the user interface components may, or may not, be active depending upon whether the gaze of the authorized user of the wearable electronic device remains directed at the companion electronic device, in one or more embodiments the companion electronic device will remain in an unlocked mode of operation as long as the companion electronic device is equal to or less than the predefined distance from the wearable electronic device.

However, were the companion electronic device moves beyond the predefined distance from the wearable electronic device, in one or more embodiments step 213 comprises the wireless communication circuit of the wearable electronic device delivering a deactuation credential to the companion electronic device. In one or more embodiments, the deactuation credential causes the companion electronic device to enter a locked mode of operation. Thus, a deactuation credential differs from a deactuation command. The latter causes one or more user interface components of the companion electronic device to cease presenting content. The former causes the companion electronic device to enter a locked mode of operation, which requires the method 200 of FIG. 2, and in particular steps 202-204, decision 205, and step 209, to occur again before the companion electronic device returns to an unlocked state.

Since step 211 can comprise the companion electronic device capturing one or more images with an imager, with the one or more sensors of the wearable electronic device identifying the gaze of the authorized user being directed at the companion electronic device from the imagers captured by the imager of the companion electronic device at decision 212, in one or more embodiments step 213 comprises the wireless communication circuit of the wearable electronic device delivering the deactuation command to the companion electronic device when the one or more sensors identify a cessation of the gaze of the authorized user of the wearable electronic device being directed at the companion electronic device from the images captured by the imager at decision 212.

Figure 6:
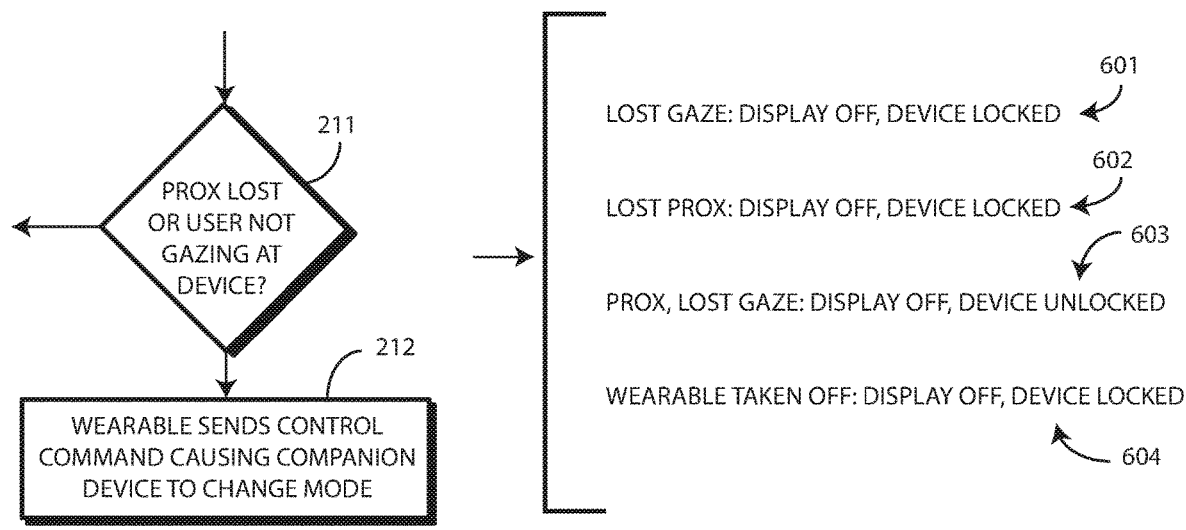
FIG. 6 illustrates one or more method steps in accordance with one or more embodiments of the disclosure.

To show how decision 212 and step 213 can function, FIG. 6 illustrates some explanatory options. Turning now to FIG. 6, in one or more embodiments both the deactuation credential and the deactuation command can be transmitted at step 601 in response to the gaze of the authorized user of the wearable electronic device being directed somewhere other than at the companion electronic device. Accordingly, in one or more embodiments loss of gaze results in both the one or more user interfaces of the companion electronic device ceasing their presentation of content and the companion electronic device being transitioned to a locked mode of operation.

In another embodiment, both the deactuation credential and the deactuation command can be transmitted at step 602 in response to the companion electronic device moving beyond the predefined distance from the wearable electronic device or vice versa. Accordingly, in one or more embodiments the distance between the wearable electronic device and the companion electronic device being too great results in both the one or more user interfaces of the companion electronic device ceasing their presentation of content and the companion electronic device being transitioned to a locked mode of operation.

In another embodiment, gaze is lost while the companion electronic device remains within the predefined distance of the wearable electronic device. In such an embodiment, step 603 can comprise transmitting only the deactuation command, but not the deactuation credential. Accordingly, the companion electronic device remains in the unlocked mode of operation, but its one or more user interface components cease the presentation of content or the delivery of information.

At step 604, the wearable electronic device is transitioned out of its wearable state, such as would be the case when the authorized user takes the wearable electronic device off their wrist or decouples it from their clothes. In one or more embodiments, when this occurs both the deactuation credential and the deactuation command can be transmitted at step 604 in response to the wearable electronic device leaving the wearable state. Accordingly, in one or more embodiments when the authorized user takes off the wearable electronic device, both the one or more user interfaces of the companion electronic device cease their presentation of content and the companion electronic device transitions to a locked mode of operation.

As illustrated and described with reference to FIGS. 1-6, embodiments of the disclosure provide secure and simple methods of unlocking, actuating, or otherwise controlling companion electronic devices that are operable with an electronic device, which in one or more embodiments is a wearable electronic device. Advantageously, embodiments of the disclosure allow an authorized user to seamlessly unlock and actuate a wide variety of companion electronic devices, including music players, televisions, media players, lights, thermostats, appliances, locks, and so forth.

For example, embodiments of the disclosure provide secure and simple methods of controlling a music player that is in wireless communication with a wearable electronic device. In one embodiment, a user can identify himself or herself to the wearable electronic device using a fingerprint sensor. Upon authentication of identification, the user can put the wearable electronic device on. Then, simply by coming into proximity with a music player and looking at it, the user can turn on the music player and make it start playing music. Advantageously, this eliminates the need for a user to navigate to an application, and through the application, which may require several touches or user interactions with the display, to perform the same operation. Thus, in one embodiment, a user simply walks by a music player and looks at it to start enjoying smooth jazz during cocktail hour.

Advantageously, embodiments of the disclosure provide a secure and fast way to lock, unlock, actuate, deactuate, or otherwise control a companion electronic device. Where multiple companion electronic devices are operating within the wireless communication radius, embodiments of the disclosure provide methods and systems for selecting between the various devices, namely, via gaze detection.

In one or more embodiments, a combination of biometric authentication, proximity with a companion electronic device, and gaze detection is used to control a companion electronic device. Advantageously, the use of biometric authentication allows multiple users of a single wearable electronic device to control their specific companion electronic devices. Illustrating by example, if a family shares one smart watch, the one or more processors operating within the smart watch can identify the family member though biometric identification, thereby allowing each member of the family to control their specific companion electronic devices when wearing the smart watch without controlling another family member's companion electronic devices.

Moreover, the biometric authentication also advantageously allows multiple users of a single wearable electronic device to control differing access levels on a companion electronic device. For instance, parents may not want their children to listen to heavy metal music. Accordingly, when a child is identified by biometric sensor of the wearable electronic device, and while they are wearing the wearable electronic device, they may be allowed to control a music player, but only to play jazz, bluegrass, or classical music. By contrast, when the biometric sensor of the wearable electronic device identifies a parent, and the parent is wearing the wearable electronic device, they may be able to control the music player to listen to bone-crushing metal like there is no tomorrow. Other advantages of embodiments of the disclosure will be obvious to those of ordinary skill in the art having the benefit of this disclosure.

In one or more embodiments, one or both of a wearable electronic device and a companion electronic device are loaded with an application, which can be downloaded, and which enables them to broadcast their device type identifiers via beacons such a via a Bluetooth.sup.™ communication protocol. In one or more embodiments, the device type identifier is broadcast continuously. In other embodiments, the device type identifier is broadcast in response to the receipt of an inquiry from another electronic device.

In one or more embodiments, the wearable electronic device has stored therein, or alternatively in the cloud, an engagement profile defining a set other device engagement rules. An authorized user can adjust the settings of the engagement profile using a menu based upon device type in one or more embodiments.

In one or more embodiments, the wearable electronic device includes one or more microphones that are listening for any communication. In one or more embodiments, the wearable electronic device monitors the types of companion electronic devices operating within its wireless communication radius, e.g., device/vehicle type when device/vehicle type and distance meets wearable electronic device menu setting. In one or more embodiments, when this occurs, a wireless communication circuit of the wearable electronic device communicates an authentication credential to the device/vehicle. In one or more embodiments, the companion electronic device matches the authentication credential with a database and engages user once confirmed. In one or more embodiments, the wearable electronic device can, using the engagement profile, define what access to grant user (owner or guest, permanent or temporary) as well as what type of content to present to the user (recent alerts, messages, lock/unlock function, environmental sensing, etc.). In one or more embodiments, the wearable electronic device and companion electronic device are shipped from the factory with preinstalled software enabling above functions.

In one or more embodiments, proximity triggers the delivery of an authentication credential, while gaze detection triggers the delivery of the actuation command. Thus, when an authorized user wearing a wearable electronic device approaches a companion electronic device with a display, once the authorized user looks at the display it turns on and automatically transitions to the authorized user's home screen in one or more embodiments.

In one or more embodiments, when the companion electronic device leaves the field of view of the authorized user, this triggers the delivery of a deactuation command, causing the display to cease presenting the home screen. Thus, in one embodiment the moment the companion electronic device leaves the field of view because the authorized user turns their head away, the screen blanks and it is locked. In another embodiment, the screen blanks and the companion electronic device locks when it moves more than a predefined distance from the wearable electronic device, thereby triggering the delivery of a deactuation credential.

In one or more embodiments, someone without the wearable electronic device, or if the authorized user user puts the wearable electronic device down, the someone or the authorized user not wearing the wearable electronic device a personal identification number or password to unlock the companion electronic device. However, in one or more embodiments the instant the companion electronic device comes back into your field of view it returns to being unlocked and screen on, provided the authorized user has once again authenticated himself or herself and is again wearing the wearable electronic device.

In one or more embodiments, the companion electronic device is allowed to time out in accordance with its internal settings. This strengthens the example above. So if the authorized user leaves the proximity of the companion electronic device defined by the predefined distance, the companion electronic device locks and requires the user to physically interact with it. However, so long as the authorized user remains close, then the "glance/attention" is all that is needed to wake the display.

Figure 7:
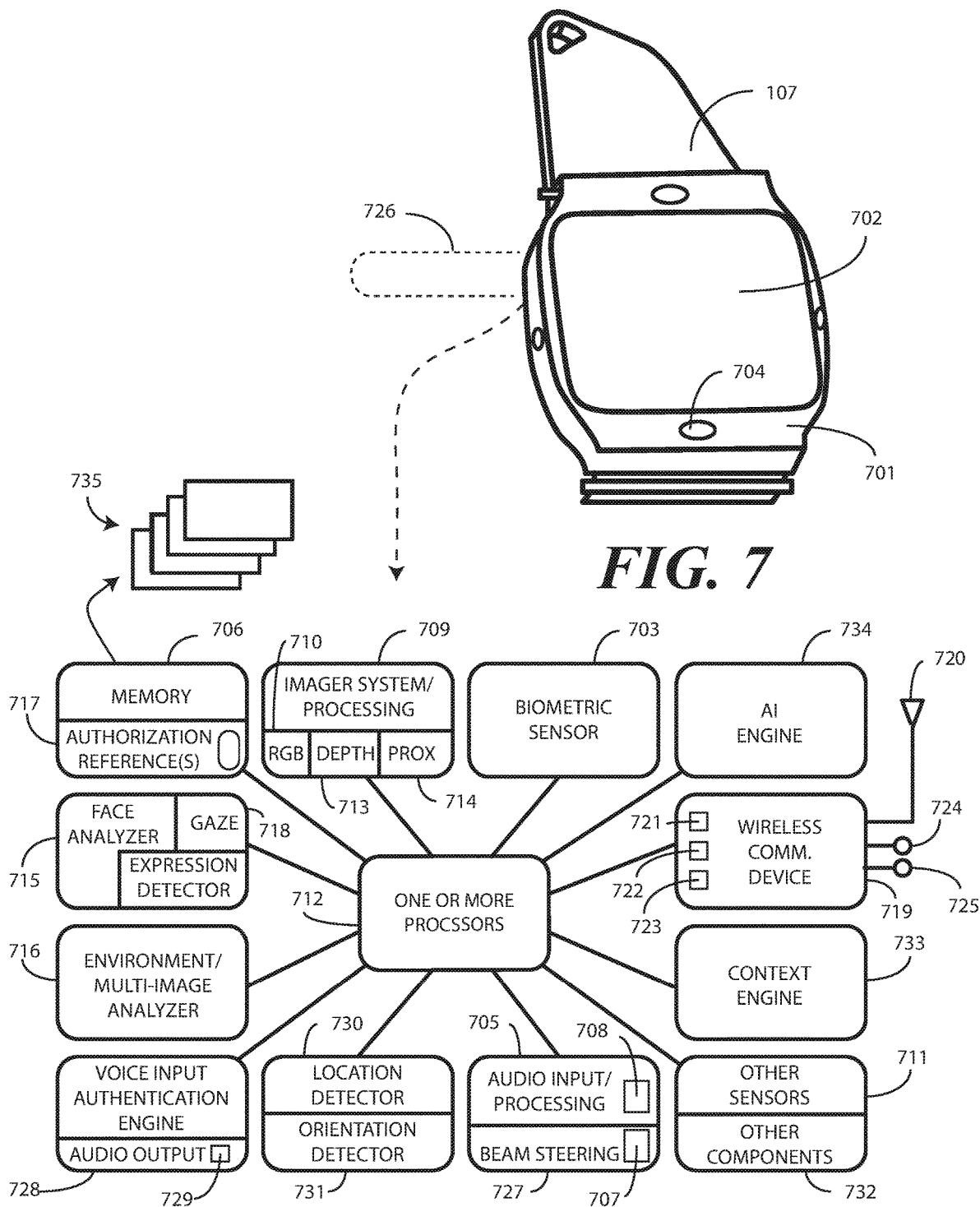
FIG. 7 illustrates one explanatory electronic device in accordance with one or more embodiments of the disclosure.

Turning now to FIG. 7, illustrated therein is one explanatory electronic device in accordance with one or more embodiments of the disclosure. In this explanatory embodiment, the electronic device is configured as a wearable electronic device 107. This illustrative wearable electronic device 107 has a housing 701 and one or more straps that allow the wearable electronic device 107 to be worn around a wrist as a watch or folded over and clipped to a garment. While a smart watch is one embodiment of a wearable electronic device 107 configured in accordance with one or more embodiments of the disclosure, other types of wearable electronic devices and/or other mechanical configurations of wearable electronic devices will be obvious to those of ordinary skill in the art having the benefit of this disclosure.

Also illustrated in FIG. 7 is one explanatory block diagram schematic of the wearable electronic device 107. It should be noted that the block diagram schematic of FIG. 7 includes many components that are optional, but which are included in an effort to demonstrate how varied electronic devices configured in accordance with embodiments of the disclosure can be. Accordingly, it is to be understood that the block diagram schematic of FIG. 7 is provided for illustrative purposes only and for illustrating components of one wearable electronic device 107 in accordance with embodiments of the disclosure. The block diagram schematic of FIG. 7 is not intended to be a complete schematic diagram of the various components required for a wearable electronic device 107.

Therefore, other wearable electronic devices in accordance with embodiments of the disclosure may include various other components not shown in FIG. 7, or may include a combination of two or more components or a division of a particular component into two or more separate components, and still be within the scope of the present disclosure. A wearable electronic device may have fewer, or different, components from another wearable electronic device configured in accordance with embodiments of the disclosure. Accordingly, wearable electronic devices configured in accordance with embodiments of the disclosure can include some components that are not shown in FIG. 7, and other components that are shown may not be needed and can therefore be omitted.

This illustrative wearable electronic device 107 includes an optional display 702, which in one embodiment is touch-sensitive and defines a user interface for the wearable electronic device 107. Users can deliver user input to the display 702 of such an embodiment by delivering touch input from a finger, stylus, or other objects disposed proximately with the display. In one embodiment, the display 702 is configured as an organic light emitting diode (OLED) display. However, it should be noted that other types of displays would be obvious to those of ordinary skill in the art having the benefit of this disclosure.

Features can be incorporated into the housing 701. In this illustrative embodiment, a biometric sensor 703 disposed along a surface of the housing 701. In one embodiment the biometric sensor 703 is responsible for identifying biometric input received at the biometric sensor 703 to authenticate or otherwise identify a user as an authorized user of the wearable electronic device 107. Other devices can be disposed along the housing 701 as well. Examples of such devices include an optional camera or speaker port for an audio output device.

In one embodiment, the biometric sensor 703 is a fingerprint sensor 704. However, other types of biometric sensors that can be substituted for the fingerprint sensor 704 will be obvious to those of ordinary skill in the art having the benefit of this disclosure. For example, in other embodiments the biometric sensor 703 can be a voice interface engine 708 of an audio input/processor 705. The voice interface engine 708 can include hardware, executable code, and speech monitor executable code in one embodiment. The voice interface engine 708 can include, stored in memory 706, basic speech models, trained speech models, or other modules that are used by the voice interface engine 708 to receive and identify a particular user's voice commands that are received with audio input captured by an audio input device, such as one or more microphones 707. In one embodiment, the voice interface engine 708 performs voice recognition operations.

In another embodiment, the biometric sensor 703 can be an imager processor system 709. The imager processor system 709 can be operable with sensors 711 of the wearable electronic device 107, such as a camera or imager 710, to process information detected from a user's gaze to identify the user through facial, eye, or other recognition techniques. The imager processor system 709 can also be configured to identify the user through facial recognition techniques by capturing photographs of the user.

The imager processor system 709 one or more processors 712. The imager processor system can include one or more sensors 711. For example, in one or more embodiments the one or more sensors 711 included with the imager processor system 709 comprise one or more of the aforementioned imager 710, a depth imager 713, and, optionally, one or more proximity sensors 714.

In one embodiment, the imager 710 comprises a two-dimensional imager configured to receive at least one image of an environment about the wearable electronic device 107. In one embodiment, the imager 710 comprises a two-dimensional Red-Green-Blue (RGB) imager. In another embodiment, the imager 710 comprises an infrared imager. Other types of imagers suitable for use as the imager 710 of wearable electronic device 107 will be obvious to those of ordinary skill in the art having the benefit of this disclosure.

The one or more proximity sensors 714, where included, can take various forms. In one or more embodiments, the one or more proximity sensors 714 fall in to one of two camps: active proximity sensors and "passive" proximity sensors. Either the proximity detector components or the proximity sensor components can be generally used for detecting persons and/or present within the environment, distances between warm objects and the wearable electronic device 107, changes in distance between warm objects and the wearable electronic device, and other information. Accordingly, in one or more embodiments the one or more proximity sensors 714 can be used as a "wearability" detector by detecting the wearable electronic device 107 being proximately located and worn by an authorized user.

As used herein, a "proximity sensor component" comprises a signal receiver only that does not include a corresponding transmitter to emit signals for reflection off an object to the signal receiver. A signal receiver only can be used due to the fact that a user's body or other heat generating object external to the wearable electronic device 107 serves as the transmitter. In one embodiment, the signal receiver is an infrared signal receiver to receive an infrared emission from a source, such as a human being, when the human being is approaching the wearable electronic device 107.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more proximity sensors 714 simply comprise a proximity sensor component. In another embodiment, the one or more proximity sensors 714 comprise a simple thermopile. In another embodiment, the one or more proximity sensors 714 comprise an infrared imager that captures the amount of thermal energy emitted by an object. In still other embodiments, the one or more proximity sensors 714 comprise a proximity detector component. Of course, combinations of these components can be used as the one or more proximity sensors 714. Moreover, other types of proximity sensors suitable for use with the wearable electronic device 107 will be obvious to those of ordinary skill in the art having the benefit of this disclosure.

As with the one or more proximity sensors 714, the depth imager 713, where included, can take a variety of forms. In a first embodiment, the depth imager 713 comprises a pair of imagers separated by a predetermined distance, such as three to four images. This "stereo" imager works in the same way the human eyes do in that it captures images from two different angles and reconciles the two to determine distance.

In another embodiment, the depth imager 713 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 713 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 713 adds a third "z-dimension" to the x-dimension and y-dimension defining the two-dimensional image captured by the imager 710, thereby enhancing the accuracy of detecting persons being present within the environment.

In one or more embodiments, the imager processor system 709 can be operable with a face analyzer 715 and an environmental analyzer 716. The face analyzer 715 and/or environmental analyzer 716 can be configured to process an image or depth scan of an object and determine whether the object matches predetermined criteria by comparing the image or depth scan to one or more predefined authentication references 717 stored in memory 706.

For example, the face analyzer 715 and/or environmental analyzer 716 can identify whether one or more persons or companion electronic devices are within an environment of the wearable electronic device 107 in one or more embodiments. Additionally, by comparing the images and/or depth scans to the predefined authentication references 717, in one or more embodiments the face analyzer 715 and/or environmental analyzer 716 can determine the identity of the one or more persons or companion electronic devices, such as whether the person is an authorized user of the wearable electronic device 107 or what type of companion electronic device may be operating within the environment. In one or more embodiments the face analyzer 715 and/or environmental analyzer 716 can employ optical and/or spatial recognition to identify persons or objects using image recognition, character recognition, visible recognition, facial recognition, color recognition, shape recognition, and the like. Advantageously, the face analyzer 715 and/or environmental analyzer 716, operating in tandem with the imager processor system 709, can be used as a facial recognition device and/or companion electronic device recognition device in one or more embodiments.

In one embodiment when the imager processor system 709 detects a person or companion electronic device, one or both of the imager 710 and/or the depth imager 713 can capture a photograph and/or depth scan of that person or the companion electronic device. The imager processor system 709 can then compare the image and/or depth scan to one or more predefined authentication references 706 stored in the memory 706. With respect to a person, this comparison, in one or more embodiments, is used to confirm beyond a threshold authenticity probability that the person's face—both in the image and the depth scan—sufficiently matches one or more of the predefined authentication references 717 stored in the memory 706 to identify the person. With respect to a companion electronic device, this comparison is used to confirm beyond a threshold authenticity probability that the object—both in the image and the depth scan—sufficiently matches one or more of the predefined authentication references 717 stored in the memory 706 to identify the type of object, e.g., whether the object is a smartphone, smart doorbell, vehicle or other type of companion electronic device.

A gaze detector 718 can be operable with the imager processor system 709 operating in conjunction with the face analyzer 715. The gaze detector 718 can comprise sensors for detecting the user's gaze point. Accordingly, where included the gaze detector 718 can be used to determine whether the gaze of the authorized user of the wearable electronic device 107 is directed toward, or away from, a detected companion electronic device. The gaze detector 718 can optionally include sensors for detecting the alignment of a user's head in three-dimensional space. Electronic signals can then be processed for computing the direction of user's gaze in three-dimensional space.

The face analyzer 715 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 710 or the depth imager 713 for computing the direction of user's gaze in three-dimensional space. Other examples of biometric sensors 703 suitable for use with embodiments of the disclosure will be obvious to those of ordinary skill in the art having the benefit of this disclosure.

In one embodiment, the fingerprint sensor 704 includes its own processor to perform various functions, including detecting a finger touching the fingerprint sensor 704, capturing and storing fingerprint data from the finger, and optionally identifying or authenticating a user based upon the fingerprint data. In one or more embodiments the processor of the fingerprint sensor 704 can, as one pre-processing step, perform a preliminary authentication of the user by comparing fingerprint data captured by the fingerprint sensor 704 to a reference file stored in memory 706, while secondary authentication is performed by the one or more processors 712. The processor of the fingerprint sensor 704 can be an on-board processor. Alternatively, the processor can be a secondary processor that is external to, but operable with, the fingerprint sensor in another embodiment. Other configurations will be obvious to those of ordinary skill in the art having the benefit of this disclosure.

In one embodiment, the fingerprint sensor 704 can include a plurality of sensors. The fingerprint sensor 704 can be a complementary metal-oxide-semiconductor active pixel sensor digital imager or any other fingerprint sensor. The fingerprint sensor 704 can be configured to capture, with the plurality of sensors, a live scan of a fingerprint pattern from a finger disposed along its surface, and to store this information as fingerprint data from the user's finger. The fingerprint sensor 704 may also be able to capture one or more images with the plurality of sensors. The images can correspond to an area beneath a surface of skin. The fingerprint sensor 704 can compare the fingerprint data or skin images to one or more references to authenticate a user in an authentication process.

While the biometric sensor 703 is disposed along a front surface of the housing 701 in this illustration, it should be noted that it could alternatively be disposed along the rear surface of the housing 701 in other embodiments. In still other embodiments, the biometric sensor 703 could be disposed beneath the display 702, thereby allowing the user to place a finger on the display 702 for identification as shown above in FIG. 1.

The wearable electronic device 107 includes one or more processors 712. The one or more processors 712 can be operable with the various components of the wearable electronic device 107. The one or more processors 712 can be configured to process and execute executable software code to perform the various functions of the wearable electronic device 107. A storage device, such as memory 706, can optionally store the executable software code used by the one or more processors 712 during operation.

In one or more embodiments, the memory 706 can store one or more engagement profiles 735 corresponding to each companion electronic device the wearable electronic device 107 is configured to operate. In one or more embodiments, each engagement profile of the one or more engagement profiles 735 corresponds to a particular companion electronic device on a one-to-one basis. In one or more embodiments, each engagement profile of the one or more engagement profiles 735 defines a predefined distance within which the corresponding companion electronic device must be for the wireless communication circuit 719 of the wearable electronic device 107 to transmit an authentication credential. In one or more embodiments, each engagement profile of the one or more engagement profiles 735 further defines an operating mode for the corresponding companion electronic device to enter upon receipt of an actuation command. In one or more embodiments, each engagement profile of the one or more engagement profiles 735 further defines at least one user preference identifying a type of content the corresponding companion electronic device should present via its user interface upon receiving the actuation command. Other examples of information that can be included with the one or more engagement profiles 735 will be obvious to those of ordinary skill in the art having the benefit of this disclosure.

The wearable electronic device 107 also includes a wireless communication circuit 719. The wireless communication circuit 719 can be configured for wired or wireless communication with one or more other devices or networks. The networks can include a wide area network, a local area network, and/or personal area network. The wireless communication circuit 719 may also utilize wireless technology for communication, such as, but are not limited to, peer-to-peer or ad hoc communications such as HomeRF, Bluetooth.sup.™ and IEEE 802.11 (a, b, g or n); and other forms of wireless communication such as infrared technology. The wireless communication circuit 719 can include wireless communication circuitry, one of a receiver, a transmitter, or transceiver, and one or more antennas 720.

In one or more embodiments, the wireless communication circuit 719 can be configured with transmitters that transmit other types of signals as well. For example, in one embodiment the wireless communication circuit 719 comprises a radio frequency transceiver 721. In another embodiment, the wireless communication circuit 719 comprises an infrared transceiver 722. In still another embodiment, the wireless communication circuit 719 comprises an ultrasound transceiver 723. Of course, the wireless communication circuit 719 can include combinations of the radio frequency transceiver 721, the infrared transceiver 722, and the ultrasound transceiver 723 as well.

In one or more embodiments, a selection between the radio frequency transceiver 721, the infrared transceiver 722, and the ultrasound transceiver 723 is adaptively made as a function of the device type identifier of the companion electronic device with which the wireless communication circuit 719 is communicating. Accordingly, the one or more processors 712 of the wearable electronic device 107 can adaptively select between causing the wireless communication circuit 719 to deliver and/or receive infrared signals, ultrasound signals, or radio frequency signals in one or more embodiments. In one or more embodiments, the selection of the transmission and receipt of the infrared signals, ultrasound signals, or radio frequency signals is made further as a function of the background environment, e.g., sun, noise, etc., for best engagement with the companion electronic device.

In one or more embodiments, the antenna 720 of the wireless communication circuit 719, for use with the radio frequency transceiver 721, or a an emitter 724, for the infrared transceiver 722 or ultrasound transceiver 723, is operable in a mode where the selected transceiver of the wireless communication circuit 719 a narrow beam that is very narrow and directive. Where the wearable electronic device 107 includes a narrow beam transmitter that is very directive, this can be used by the gaze detector 718 to conclude presumptive gaze direction. In one or more embodiments, the one or more processors of the wearable electronic device 107 conclude that an authorized user has their gaze directed at a companion electronic device when the gaze detector 718 directive, narrow beam is in communication with the companion electronic device, i.e., when the authorized user has pointed the emitter 724 or antenna 720 of the wireless communication circuit 719 of the wearable electronic device 107 directly at the companion electronic device.

In still other embodiments, the companion electronic device has a narrow beam transmitter while the wearable electronic device 107 has a narrow beam, and thus very directive, antenna 720 of the wireless communication circuit 719, for use with the radio frequency transceiver 721, or a receiver 725, for the infrared transceiver 722 or ultrasound transceiver 723, is operable in a mode where the selected transceiver of the wireless communication circuit 719 a narrow beam that is very narrow and directive. As with the narrow beam transmitter, the antenna 720 or receiver 725 of the wearable electronic device 107 can receive one or more of infrared signals, ultrasound signals, or radio frequency signals.

Where the wearable electronic device 107 includes a narrow beam antenna 720 or receiver 725, the one or more processors 712 of the wearable electronic device 107 conclude that the authorized user 106 has their gaze directed at the companion electronic device when the gaze detector 718 concludes the directive, narrow beam antenna 720 or receiver 725 is receiving signals from the companion electronic device 112, i.e., when the authorized user 106 has pointed the receiver of the wireless communication circuit of the wearable electronic device 107 directly at the companion electronic device 112.

In one or more embodiments, the wearable electronic device 107 can be shaped to have a pointer surface 726 so that the authorized user understands where the directive beam is oriented. For example, in one or more embodiments the wearable electronic device 107 is shaped like a pen or includes a protrusion or is shaped like a pointer finger or has a surface from which the directive, narrow beam emanates. Accordingly, the authorized user can direct the pointer surface 726 toward the companion electronic device such that the narrow beam will be in communication with the companion electronic device to identify gaze.

In other embodiments, the infrared signals, radio frequency signals, or ultrasound signals can emanate from a surface, such as the display 702 of the wearable electronic device 107. Accordingly, the authorized user can direct the display 702 or other designated surface toward the companion electronic device such that the narrow beam will be in communication with the companion electronic device to identify gaze.

In one or more embodiments, the wearable electronic device 107 includes an audio input/processor 705. The audio input/processor 705 is operable to receive audio input from a source, such as a person, authorized user, plurality of persons within an environment about the wearable electronic device 107, from the environment about the wearable electronic device 107, or combinations thereof. The audio input/processor 705 can include hardware, executable code, and speech monitor executable code in one embodiment. The audio input/processor 705 can be operable with one or more predefined authentication references 717 stored in memory 706.

The predefined authentication references 717 can comprise representations of basic speech models, representations of trained speech models, or other representations of predefined audio sequences that are used by the audio input/processor 705 to receive and identify speech captured by an audio input device, one example of which are the one or more microphones 707. In one embodiment, the audio input/processor 705 can include a voice interface engine 708. Regardless of the specific implementation utilized in the various embodiments, the audio input/processor 705 can access various speech models stored with the predefined authentication references 717 to identify speech commands.

The audio input/processor 705 can include a beam steering engine 727. The beam steering engine 727 can be operable with one or both of an audio input device, such as one or more microphones 707, and/or an audio output device 728, such as one or more loudspeakers 729. When functioning with the audio input/processor 705, the beam steering engine 727 can process audio input from, for example, one or more microphones 707 defining a virtual microphone. This virtual microphone can define an acoustic reception cone that can be virtually "steered" around the wearable electronic device 107. Alternatively, actual steering can occur as well, such as switching between a left microphone and right microphone or a front and back microphone, or switching various microphones ON and OFF individually. In one or more embodiments, two or more microphones can be included for selective beam steering by the beam steering engine 727.

Various sensors 711 can be operable with the one or more processors 712. A first example of a sensor that can be included with the various sensors 711 is a touch sensor. The touch sensor can include a capacitive touch sensor, an infrared touch sensor, resistive touch sensors, or another touch-sensitive technology. The touch sensor can be configured to detect an object in close proximity with—or touching—the surface of the display 702 or the housing 701 of the wearable electronic device 107.

Another example of a sensor 711 is a geo-locator that serves as a location detector 730. In one embodiment, location detector 730 is able to determine location data. Location can be determined by capturing the location data from a constellation of one or more earth orbiting satellites, or from a network of terrestrial base stations to determine an approximate location. The location detector 730 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 731 that determines an orientation and/or movement of the wearable electronic device 107 in three-dimensional space. Illustrating by example, the orientation detector 731 can include an accelerometer, gyroscopes, or other device to detect device orientation and/or motion of the wearable electronic device 107. Using an accelerometer as an example, an accelerometer can be included to detect motion of the electronic device. Additionally, the accelerometer can be used to sense some of the gestures of the user, such as one talking with their hands, running, or walking.

The orientation detector 731 can determine the spatial orientation of the wearable electronic device 107 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the wearable electronic device 107.

Other components 732 operable with the one or more processors 712 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers 729, ultrasound transducers, or other alarms and/or buzzers. The other components 732 can also include a mechanical output component such as vibrating or motion-based mechanisms.

The other components 732 can optionally include a barometer operable to sense changes in air pressure due to elevation changes or differing pressures of the wearable electronic device 107. The other components 732 can also optionally include a light sensor that detects changes in optical intensity, color, light, or shadow in the environment of the wearable electronic device 107. An infrared sensor can be used in conjunction with, or in place of, the light sensor. Similarly, a temperature sensor can be configured to monitor temperature about an electronic device.

In one or more embodiments, the one or more processors 712 can define one or more process engines. One example of such a process engine is a context engine 733. The process engines can be a component of the one or more processors 712, operable with the one or more processors 712, defined by the one or more processors 712, and/or integrated into the one or more processors 712. Other configurations for the process engines, including as software or firmware modules operable on the one or more processors 712, will be obvious to those of ordinary skill in the art having the benefit of this disclosure.

The context engine 733 can be operable with the various sensors to detect, infer, capture, and otherwise determine persons and actions that are occurring in the environment about the wearable electronic device 107. For example, where included one embodiment of the context engine 733 determines assessed contexts and frameworks using adjustable algorithms of context assessment employing information, data, and events. These assessments may be learned through repetitive data analysis, and may be assisted by an artificial intelligence (AI) engine 734. Alternatively, a user may employ the user interface of the wearable electronic device 107 to enter various parameters, constructs, rules, and/or paradigms that instruct or otherwise guide the context engine 733 in detecting multi-modal social cues, emotional states, moods, and other contextual information. The context engine 733 can comprise an artificial neural network, an AI engine 734, or other similar technology in one or more embodiments.

In one or more embodiments, the context engine 733 is operable with the one or more processors 712. In some embodiments, the one or more processors 712 can control the context engine 733. In other embodiments, the context engine 733 can operate independently, delivering information gleaned from detecting multi-modal social cues, emotional states, moods, and other contextual information to the one or more processors 712. The context engine 733 can receive data from the various sensors. In one or more embodiments, the one or more processors 712 are configured to perform the operations of the context engine 733.

Figure 8:
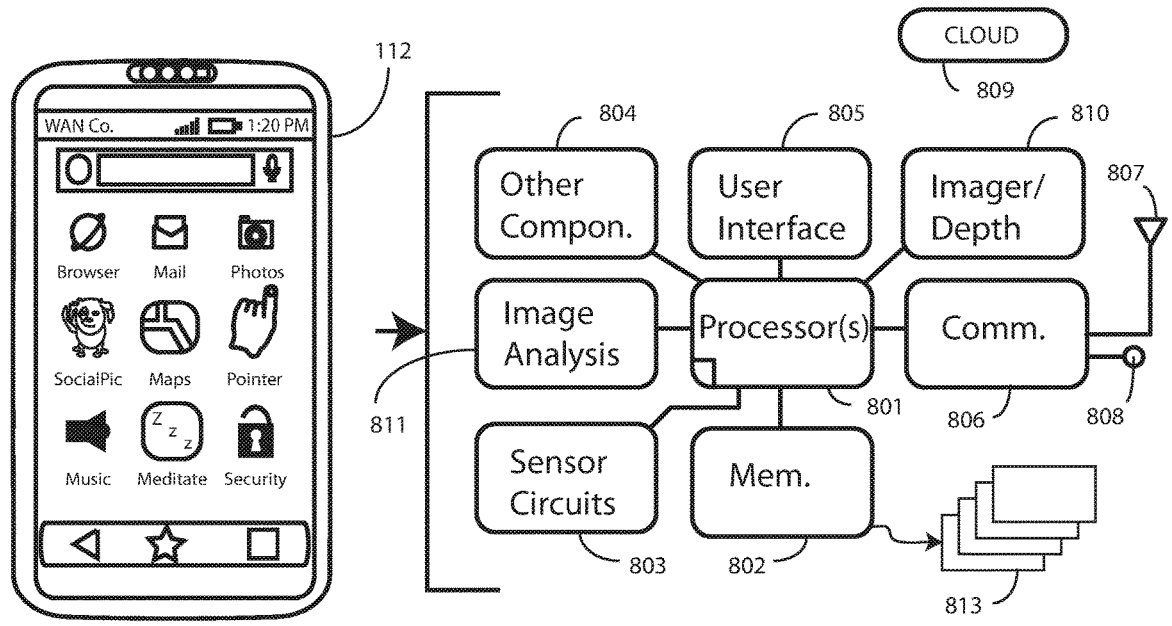
FIG. 8 illustrates one explanatory companion electronic device in accordance with one or more embodiments of the disclosure.
Figure 9:
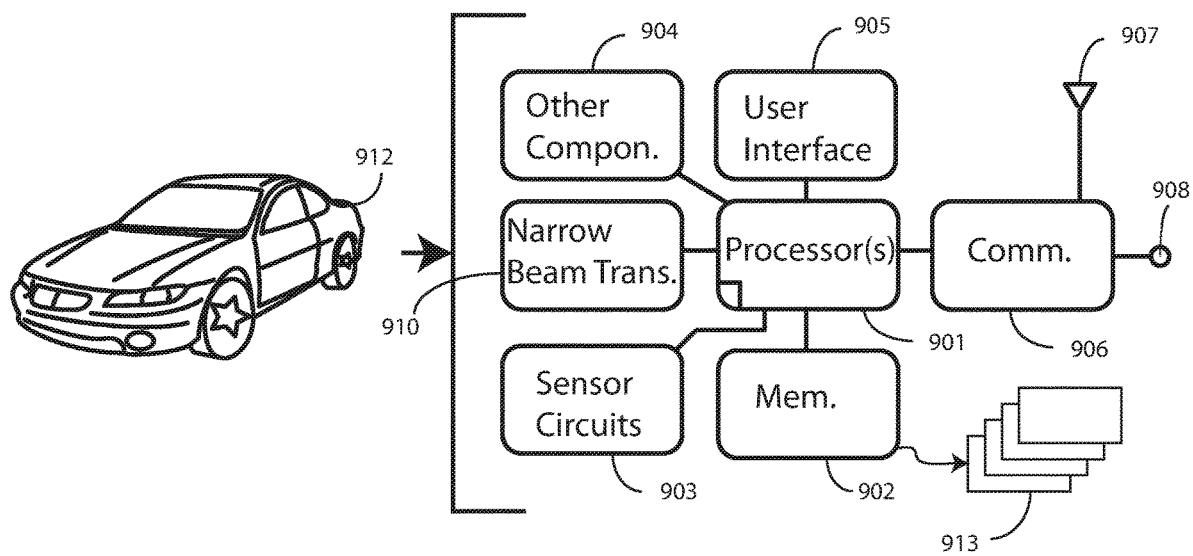
FIG. 9 illustrates another explanatory companion electronic device in accordance with one or more embodiments of the disclosure.

Turning now to FIGS. 8-9, illustrated therein are two explanatory companion electronic devices 112, 912. The explanatory companion electronic device 112 of FIG. 8 is a smartphone, while the explanatory companion electronic device 912 of FIG. 9 is a vehicle. However, it should be noted that companion electronic devices configured in accordance with one or more embodiments of the disclosure can take other forms as well. In various embodiments, the companion electronic device may be configured as a laptop computer, a handheld computer, a tablet computer, a personal data assistant, a music player, voice assistant device, a game device, and so forth. Other examples of companion electronic devices will be obvious to those of ordinary skill in the art having the benefit of this disclosure.

Each companion electronic device 112, 912 implements a computing system that comprises, among other things, one or more processors 801, 901, a memory 802, 902, sensor circuits 803, 903, which may include microphones, motion sensors, e.g., accelerometers and gyroscopes, and other sensors, e.g., a magnetometer or compass. Each companion electronic device 112, 912 can include other components 804, 904 such as one or more speakers or location detection modules. Each companion electronic device 112, 912 includes a user interface 805, 905, which may include a display that is touch-sensitive.

The memory 802, 902 may be a volatile memory or a non-volatile memory. In one or more embodiments, the memory 802, 902 of each companion electronic device 112, 912 stores at least a device type identifier 813, 913 that can be transmitted to a wearable electronic device as previously described.

Each companion electronic device 112, 912 includes a communication device 806, 906 for transmitting and receiving one or more of radio frequency signals, infrared signals, or ultrasound signals via an antenna 807, 907 or emitter/receiver pair 808, 908 over a wireless communication link. In one embodiment, a cloud computing resource 809, 909 may interface with the companion electronic device 112, 912 to implement one or more of the functions described herein.

A distinction between the companion electronic device 112 of FIG. 8 and the companion electronic device 912 of FIG. 9 is that the companion electronic device 112 of FIG. 8 includes an imager 810, which is optionally operable with an image analysis engine 811 to process images and identify objects therein, while the companion electronic device 912 of FIG. 9 includes instead a narrow beam transceiver 910 operable with the communication device 906. Accordingly, the companion electronic device 112 of FIG. 8 would be suitable to perform, for example, the gaze detection operations described above in FIG. 5 with reference to steps (503, 504), while the companion electronic device 912 of FIG. 9 would be suitable to perform the gaze detection operations described above in FIG. 5 with reference to step 505.

Figure 10:
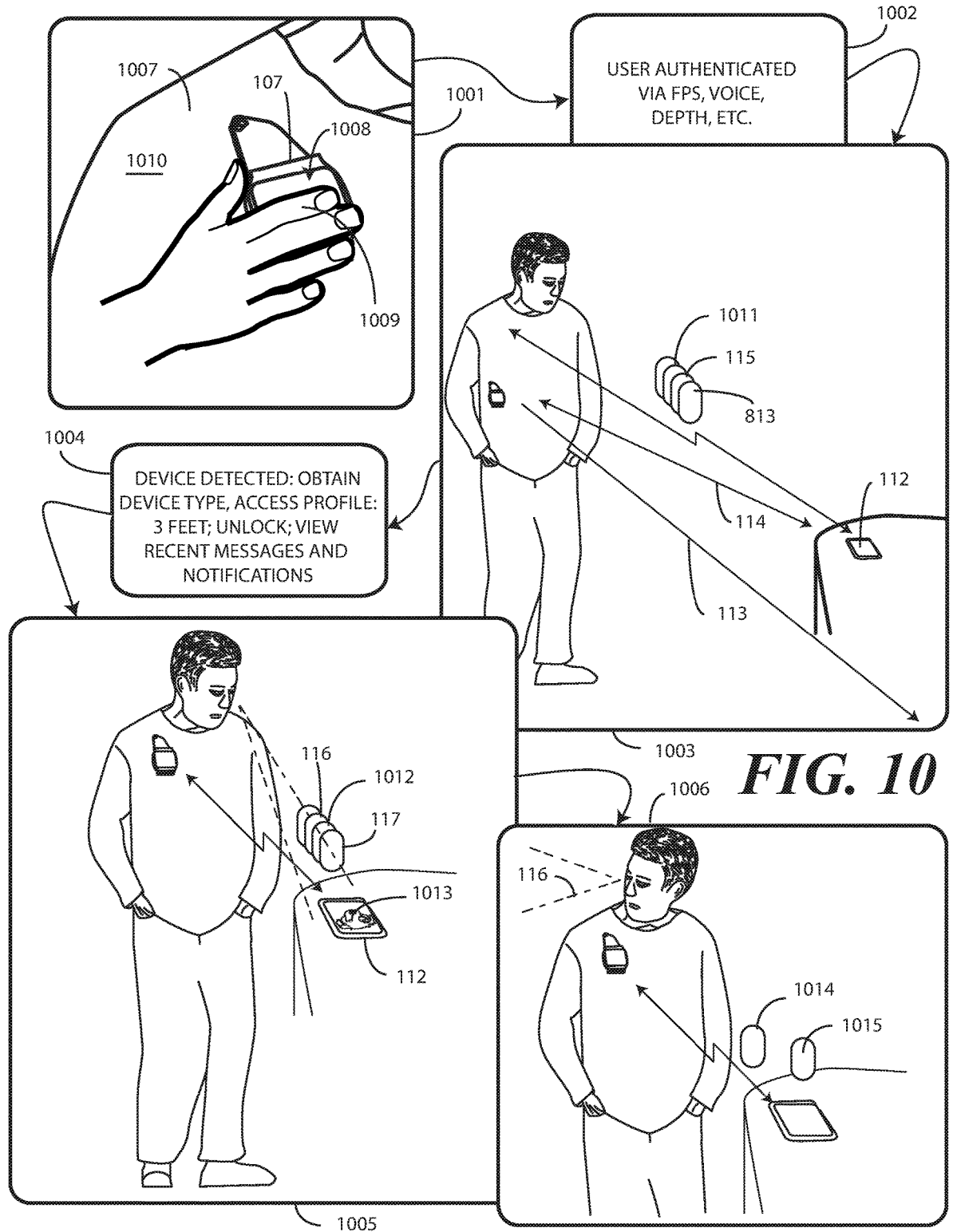
FIG. 10 illustrates one explanatory method for an electronic device in accordance with one or more embodiments of the disclosure.

Turning now to FIG. 10, illustrated therein is another explanatory method in accordance with one or more embodiments of the disclosure. At step 1001 a person 1007 grasps 1008 a wearable electronic device 107, placing their finger 1009 atop a biometric sensor (703), which in this embodiment is a fingerprint sensor (704). The person 1007 also attaches the wearable electronic device 107 to their shirt 1010, thereby transitioning the wearable electronic device 107 to a wearable state. At step 1001, one or more sensors (711) of the wearable electronic device 107 identify the wearable electronic device 107 being worn by the authorized user.

At step 1002, the biometric sensor (703) receives biometric input from the finger 1009. At step 1002, the biometric sensor (703) authenticates the person 1006 as the authorized user of the wearable electronic device 107 from the biometric input received at the biometric sensor (703).

At step 1003, a companion electronic device 112, which is configured as a smartphone in this illustrative embodiment, is operating within a wireless communication radius of the wearable electronic device 107. At step 1003, the authorized user has moved to a location where the wearable electronic device 107 is within a predefined distance 114 of the companion electronic device 112.

At steps 1003-1004, one or more sensors (711) of the wearable electronic device 107 identify the wearable electronic device 107 being within the predefined distance 114 of the companion electronic device 112. In one or more embodiments, this identification occurs when a wireless communication circuit (719) of the wearable electronic device 107 receives, from the companion electronic device 112, a device type identifier 813 at steps 1003-1004. In other embodiments, this identification occurs when an imager (710) of the wearable electronic device 107 captures one or more images of the companion electronic device 112, with the one or more processors (712) of the wearable electronic device 107 determining a device type identifier for the companion electronic device 112 from the one or more images.

In one or more embodiments, the wearable electronic device 107 comprises a memory (706) operable one or more processors (712) of the wearable electronic device 107. In one or more embodiments, the memory stores one or more engagement profiles (735), with at least one engagement profile corresponding to companion electronic device 112 identified from the device type identifier 813.

In one or more embodiments, each engagement profile (735) defines the predefined distance 114. In one or more embodiments, each engagement profile (735) also defines an operating mode for the companion electronic device 112 to enter upon receipt of any actuation command. In one or more embodiments, each engagement profile (735) further defines at least one user preference identifying a type of content to present on a display of the companion electronic device 112 in response to receiving an actuation command. In one or more embodiments, the one or more processors (712) retrieve an engagement profile for the companion electronic device 112 as a function of the device type identifier 813 at steps 1003-1004.

At steps 1003-1004, a wireless communication circuit (719) of the wearable electronic device 107, which is responsive to the one or more processors (712) of the wearable electronic device 107, delivers an authentication credential 115 to the companion electronic device 112 in response to the one or more sensors (711) identifying that the wearable electronic device 107 is within the predefined distance 114 of the companion electronic device 112. In one or more embodiments, the authentication credential 115 causes the companion electronic device 112 to transition from a locked mode of operation to an unlocked mode of operation while the user interface devices of the companion electronic device 112 remain inactive.

At step 1005, one or more sensors (711) of the wearable electronic device 107 thereafter detect a gaze 116 of the authorized user of the wearable electronic device 107 being directed at the companion electronic device 112. This can occur in one of several ways. In one or more embodiments, the companion electronic device comprises an imager (810). In one or more embodiments, one or more sensors (711) or a gaze detector (718) of the wearable electronic device 107 identify the gaze 116 of the authorized user of the wearable electronic device 107 being directed at the companion electronic device 112 from images 1011 captured by the imager (810). Other techniques for identifying the gaze 116 of the authorized user of the wearable electronic device 107 being directed at the companion electronic device 112, described above with reference to FIG. 5, can be substituted for this method.

Since the gaze 116 of the authorized user of the wearable electronic device 107 is directed at the companion electronic device 112 at step 1005, in one or more embodiments the wireless communication circuit (719) of the wearable electronic device 107 deliver an actuation command 117 to the companion electronic device 112 in response to the one or more sensors (711) detecting this fact. In one or more embodiments, the wireless communication circuit (719) delivers the actuation command 117 to the companion electronic device 112 only when the one or more sensors (711) identify the wearable electronic device 107 is being worn by the authorized user.

In one or more embodiments, the actuation command 117 causes the companion electronic device 112 to enter a predefined operating mode identified by the engagement profile (735) associated with the companion electronic device 112. In this example, the predefined operating mode is a picture-sharing mode of operation.

In one or more embodiments, step 1005 further comprises delivering, by the wireless communication circuit (719) with the actuation command 117, at least one user preference 1012 identifying a type of content 1013 to present on a display of the companion electronic device 112. In this example, the type of content 1013 comprises photographs that scroll across the display. Accordingly, the one or more processors (801) of the companion electronic device 112 present a picture of the authorized user's dog, Buster, on the display of the companion electronic device 112.

At step 1006, the one or more sensors (711) of the wearable electronic device 107 identify the gaze 116 of the authorized user being directed away from the companion electronic device 112. In one or more embodiments, in response to detecting the gaze 116 of the authorized user being directed away from the companion electronic device 112, the wireless communication circuit (719) of the wearable electronic device 107 delivers a deactuation command 1014 to the companion electronic device 112. In one or more embodiments, the deactuation command 1014 causes the display of the companion electronic device 112 to cease presenting content, as shown at step 1006. When the gaze 116 of the authorized user returns to the companion electronic device 112, step 1005 can repeat, returning the display of the companion electronic device 112 to the active mode of operation.

When the authorized user moves more than the predefined distance 114 from the companion electronic device 112, e.g., when the one or more sensors (711) of the wearable electronic device 107 identify both the gaze 116 of the authorized user being directed away from the companion electronic device 112 and the wearable electronic device 107 being outside the predefined distance 114 of the companion electronic device 112, as was the case at step 1001, in one or more embodiments, the wireless communication circuit (719) delivers a deactuation credential 1015 to the companion electronic device 112. In one or more embodiments, the deactuation credential 1015 causes the companion electronic device 112 to enter a locked mode of operation.

Figure 11:
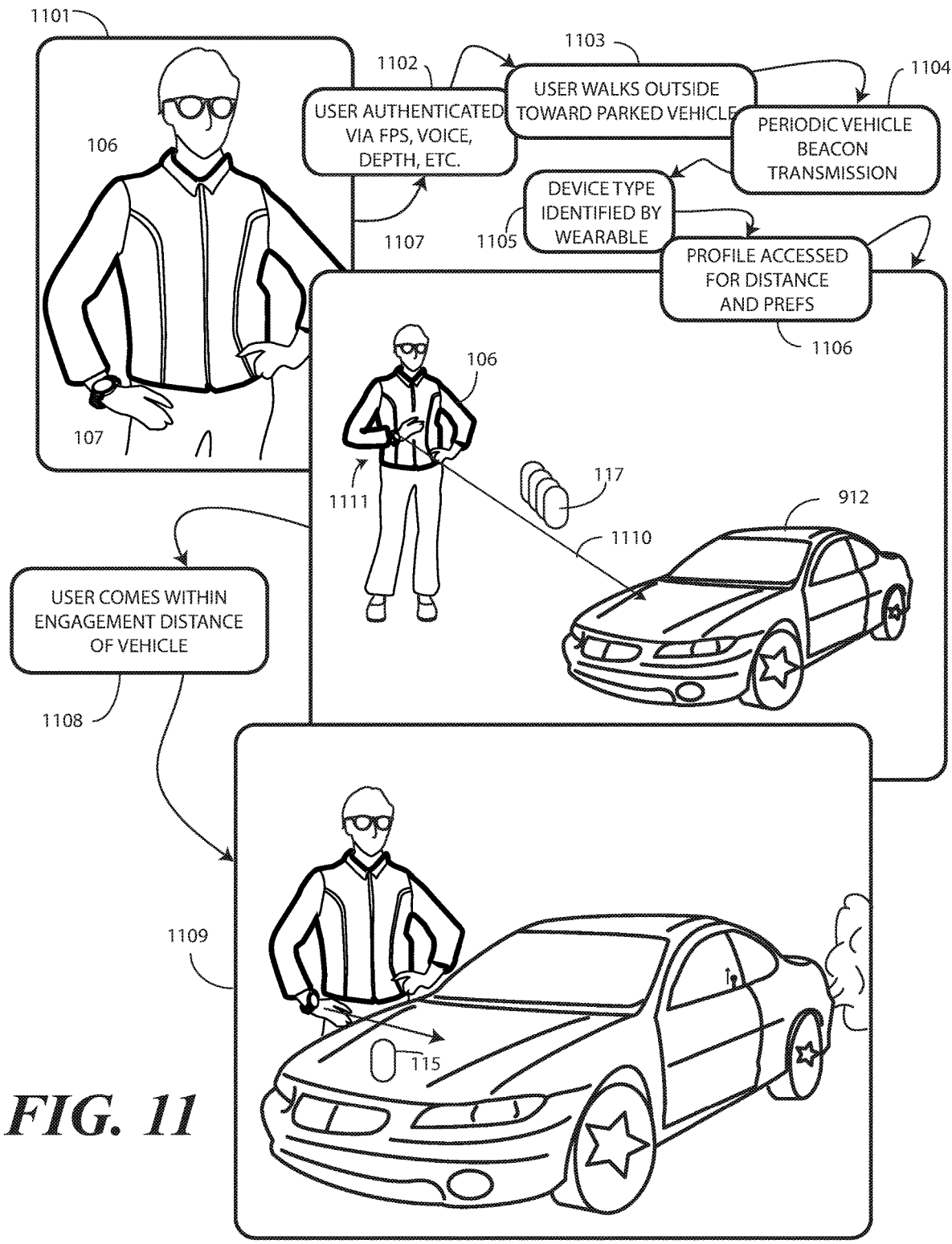
FIG. 11 illustrates another explanatory method for an electronic device in accordance with one or more embodiments of the disclosure.

Turning now to FIG. 11, illustrated therein is another explanatory method in accordance with one or more embodiments of the disclosure. At step 1101 an authorized user 106 of a wearable electronic device 107, configured as a smart watch, is wearing the wearable electronic device 107 on their wrist. At step 1102, one or more sensors (711) of the wearable electronic device 107 identify the wearable electronic device 107 being worn by the authorized user 106.

At step 1102, a biometric sensor (703), which can be an imager (710), a depth imager (713), a fingerprint sensor (704), a voice interface engine (708), or other biometric sensors, authenticates the authorized user 106.

At step 1103, the authorized user 106 walks to a location where a companion electronic device 912, configured as a vehicle in this embodiment, is operating within a wireless communication radius of the wearable electronic device 107. At step 1104, the companion electronic device 912 broadcasts a periodic beacon, in the form of a radio frequency signal, which includes a device type identifier. At step 1105, the wearable electronic device 107 receives the device type identifier and identifies the companion electronic device 912 as a vehicle.

At step 1106, a memory (706) of the wearable electronic device 107 stores one or more engagement profiles (735). At least one engagement profile corresponding to companion electronic device 912 identified from the device type identifier received at step 1105. At step 1106, one or more processors (712) of the wearable electronic device 107 access the one or more engagement profiles (735) to identify one or more of a predefined distance at which to send the companion electronic device 912 an authentication credential, an operating mode for the companion electronic device 912 to enter upon receipt of any actuation command, and/or a type of content to deliver from a user interface of the companion electronic device 912 in response to receiving an actuation command.

Since the companion electronic device 912 does not include an imager, one or more processors (712) of the wearable electronic device 107 infer a gaze direction when the 1110 when the authorized user 106 points 1111 a predefined surface 1112 of the wearable electronic device 107 at the companion electronic device 912. A radio frequency transceiver (721) then transmits a narrow, directive beam to the companion electronic device 912 using an antenna 720. Since this narrow, directive beam is directed to the companion electronic device 912, the one or more processors (712) or a gaze detector (718) conclude that the authorized user 106 is gazing at the companion electronic device 912.

Since the gaze of the authorized user 106 has been presumptively determined to be directed at the companion electronic device 912 at step 1107, in one or more embodiments the wireless communication circuit (719) of the wearable electronic device 107 deliver an actuation command 117 to the companion electronic device 912 in response to the one or more sensors (711) detecting this fact. Ordinarily, the actuation command 117 causes the companion electronic device 912 to enter a predefined operating mode identified by the engagement profile (735) associated with the companion electronic device 912. In this example, the predefined operating mode is starting the car. However, the authorized user 106 is beyond the predefined distance from the companion electronic device 912 identified by the engagement profile (735) associated with the companion electronic device 912. Accordingly, one or more processors (901) of the companion electronic device 912 receive the actuation command 117 and store it until either a deactuation command is received or an authentication credential is received.

At step 1108, the authorized user 106 moves to a location where the wearable electronic device 107 is within a predefined distance of the companion electronic device 912. At step 1108, one or more sensors (711) of the wearable electronic device 107 identify the wearable electronic device 107 being within the predefined distance of the companion electronic device 912.

At step 1109, a wireless communication circuit (719) of the wearable electronic device 107, which is responsive to the one or more processors (712) of the wearable electronic device 107, delivers an authentication credential 115 to the companion electronic device 912 in response to the one or more sensors (711) identifying that the wearable electronic device 107 is within the predefined distance of the companion electronic device 912. In one or more embodiments, the authentication credential 115 causes the companion electronic device 912 to transition from a locked mode of operation to an unlocked mode of operation while the user interface devices of the companion electronic device 912 remain inactive. Since the companion electronic device 912 has already received the actuation command 117, and has now received the authentication credential 115, the companion electronic device 912 starts its engine, as shown in FIG. 11.

Figure 12:
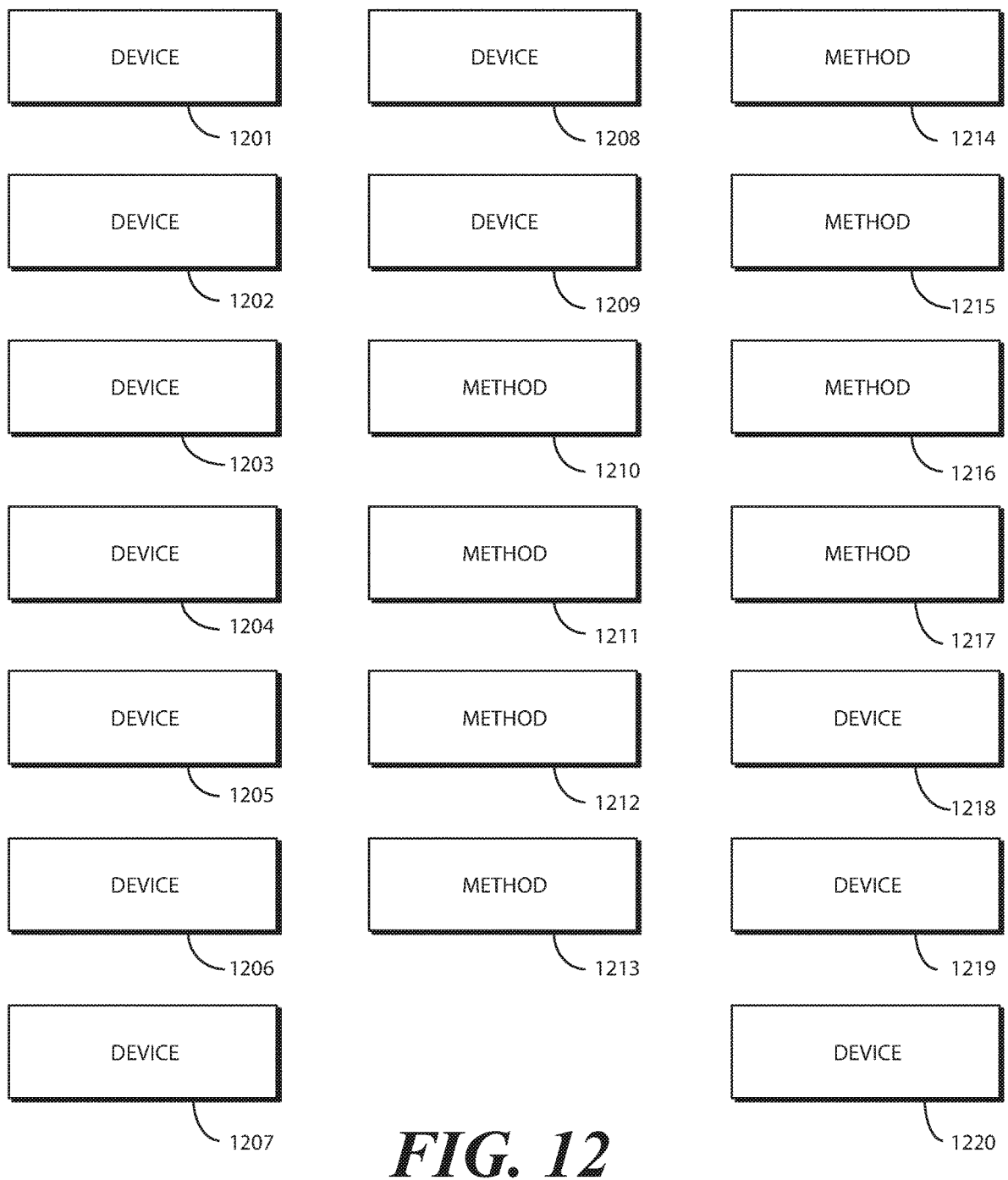
FIG. 12 illustrates one or more embodiments of the disclosure.

Turning now to FIG. 12, illustrated therein are various embodiments of the disclosure. At 1201, a wearable electronic device comprises one or more processors identifying one or more companion electronic devices operating within a wireless communication radius of the wearable electronic device. At 1201, the wearable electronic device comprises one or more sensors identifying the wearable electronic device being within a predefined distance of a companion electronic device of the one or more companion electronic devices.

At 1201, the wearable electronic device comprises a wireless communication circuit responsive to the one or more processors. At 1201, the wireless communication circuit delivers an authentication credential to the companion electronic device in response to the one or more sensors identifying that the wearable electronic device is within the predefined distance of the companion electronic device.

At 1201, the one or more sensors thereafter detect a gaze of an authorized user of the wearable electronic device being directed at the companion electronic device. At 1201, the wireless communication circuit delivers an actuation command to the companion electronic device in response to the one or more sensors detecting that the gaze of the authorized user is directed at the companion electronic device.

At 1202, the wearable electronic device of 1201 further comprises a biometric sensor authenticating the authorized user of the wearable electronic device from biometric input received at the biometric sensor. At 1203, the one or more sensors of 1201 identify the gaze of the authorized user being directed away from the companion electronic device and, in response, the wireless communication circuit delivering a deactuation command to the companion electronic device. At 1204, the deactuation command causes a display of the companion electronic device to cease presenting content.

At 1205, the one or more sensors of 1201 identify both the gaze of the authorized user being directed away from the companion electronic device and the wearable electronic device being outside the predefined distance of the companion electronic device. At 1205, in response, the wireless communication circuit delivers a deactuation credential to the companion electronic device. At 1206, the deactuation credential causes the companion electronic device to enter a locked mode of operation.

At 1207, the one or more sensors of 1201 identify the wearable electronic device being worn by the authorized user. At 1207, the wireless communication circuit delivers the actuation command to the companion electronic device only when the one or more sensors identify the wearable electronic device being worn by the authorized user.

At 1208, the wearable electronic device of 1201 further comprises a memory operable with the one or more processors. At 1208, the memory stores one or more engagement profiles corresponding to the one or more companion electronic devices, with each engagement profile defining the predefined distance. At 1209, the each engagement profile of 1208 further defines an operating mode to enter upon receipt of the actuation command.

At 1210, a method in a wearable electronic device comprises identifying, by one or more processors operable with one or more sensors and a wireless communication circuit, a companion electronic device operating within a predefined distance of the wearable electronic device. At 1210, the method comprises delivering, by the wireless communication circuit, an authentication credential to the companion electronic device.

At 1210, the method comprises detecting, by the one or more sensors, a gaze of an authorized user of the wearable electronic device upon the companion electronic device. At 1210, the method comprises delivering, by the wireless communication circuit, an actuation command to the companion electronic device. At 1210, the actuation command instructs a user interface component of the companion electronic device to enter an active mode of operation.

At 1211, the method of 1210 further comprises detecting, by the one or more sensors, a cessation of the gaze of the authorized user of the wearable electronic device upon the companion electronic device. At 1211, the method further comprises delivering, by the wireless communication circuit, a deactuation command to the companion electronic device. At 1211, the deactuation command causes a display of the companion electronic device to cease presenting content.

At 1212, the method of 1211 further comprises detecting, by the one or more sensors, the companion electronic device moving beyond the predefined distance from the wearable electronic device. At 1212, the method comprises delivering, by the wireless communication circuit, a deactuation credential to the companion electronic device. At 1212, the deactuation credential causes the companion electronic device to enter a locked mode of operation.

At 1213, the method of 1210 further comprises delivering, by the wireless communication circuit with the actuation command, at least one user preference identifying a type of content to present on a display of the companion electronic device. At 1214, the method of 1213 further comprises receiving, by the wireless communication circuit from the companion electronic device, a device type identifier and retrieving, by the one or more processors from a memory of the wearable electronic device, an engagement profile for the companion electronic device as a function of the device type identifier. At 1215, the engagement profile of 1214 identifies both the predefined distance and the at least one user preference identifying the type of content to present on the display.

At 1216, the method of 1213 further comprises capturing, by an imager of the wearable electronic device, one or more images of the companion electronic device. At 1216, the method comprises determining, by the one or more processors, a device type identifier for the companion electronic device from the one or more images.

At 1217, a wearable electronic device comprises one or more processors operable with a memory. At 1217, the one or more processors identify a companion electronic device operating within a wireless communication radius of the wearable electronic device. At 1217, the one or more processors retrieve, from the memory, an engagement profile as a function of a device type of the companion electronic device.

At 1217, the wearable electronic device comprises one or more sensors identifying the wearable electronic device being within a predefined distance of a companion electronic device identified by the engagement profile and that a gaze of an authorized user of the wearable electronic device being directed at the companion electronic device. At 1217, the wearable electronic device comprises a wireless communication circuit that is responsive to the one or more processors. At 1217, the wireless communication circuit delivers an authentication credential to the companion electronic device upon the one or more sensors identifying that the wearable electronic device is within the predefined distance of the companion electronic device and delivering an actuation command upon identifying that the gaze of the authorized user is directed at the companion electronic device.

At 1218, the engagement profile of 1217 further identifies a predefined operating mode for the companion electronic device. At 1218, the actuation command causes the companion electronic device to enter the predefined operating mode.

At 1219, the companion electronic device of 1217 comprises an imager. At 1219, one or more sensors identify the gaze of the authorized user of the wearable electronic device being directed at the companion electronic device from images captured by the imager. At 1220, the wireless communication circuit of 1217 delivers a deactuation command to the companion electronic device when the one or more sensors identify a cessation of the gaze of the authorized user of the wearable electronic device being directed at the companion electronic device from the images captured by the imager.

Embodiments of the disclosure described above can be implemented with a myriad of companion electronic devices. For example, when the companion electronic device comprises a mobile phone, initially a person is authenticated to the wearable electronic device as the authorized user via voice, fingerprint, or facial recognition. One or more sensors detect the wearable electronic device being worn. When the mobile phone is sitting on a table, and the authorized user comes near while wearing the wearable electronic device, the wearable electronic device identifies the companion electronic device as a mobile phone.

In one or more embodiments, the wearable electronic device accesses an engagement profile based upon the fact that the companion electronic device is a mobile phone. In one or more embodiments, when the authorized user gets less than a foot away from the companion electronic device, the wearable electronic device communicates an authentication credential to the companion electronic device. In one or more embodiments, the authentication credential causes the companion electronic device to unlock.

If the wearable electronic device is a pair of glasses, and points to the companion electronic device, an imager of the wearable electronic device determines that the authorized user is gazing at the companion electronic device. Alternatively, the wearable electronic device can cause an imager of the companion electronic device to actuate and assess the direction of gaze of the authorized user via image analysis. In either case, when this occurs the wearable electronic device transmits an authentication credential to the companion electronic device causing the display of the companion electronic device to present recent notifications to the authorized user in one or more embodiments.

In one or more embodiments, when the authorized user looks away from the companion electronic device, the wearable electronic device transmits a deactuation command to the companion electronic device causing the display to stop presenting content. If the authorized user steps back to, say, four feet from the companion electronic device, the wearable electronic device transmits a deactuation credential causing the companion electronic device to enter a locked mode of operation.

When the companion electronic device comprises a computer, initially a person is authenticated to the wearable electronic device as the authorized user via voice, fingerprint, or facial recognition. One or more sensors detect the wearable electronic device being worn. When the computer is sitting on a table, and the authorized user comes within, say, fifteen feet of the computer while wearing the wearable electronic device, the wearable electronic device identifies the companion electronic device as a computer.

In one or more embodiments, the authorized user then walks toward the computer and stands there and/or stops. In one or more embodiments, the wearable electronic device then accesses an engagement profile based upon the fact that the companion electronic device is a computer. In one or more embodiments, the wearable electronic device communicates an authentication credential to the companion electronic device. In one or more embodiments, the authentication credential causes the companion electronic device to unlock.

In one or more embodiments, no content is yet shared with the authorized user. Instead, gaze at the computer is required. If the wearable electronic device is a pair of glasses, and points to the companion electronic device, an imager of the wearable electronic device determines that the authorized user is gazing at the companion electronic device. Alternatively, the wearable electronic device can cause an imager of the companion electronic device to actuate and assess the direction of gaze of the authorized user via image analysis. In either case, when this occurs the wearable electronic device transmits an authentication credential to the companion electronic device causing the display of the companion electronic device to present recent emails that arrived since the last engagement, as well as news briefs, to the authorized user in one or more embodiments. In one or more embodiments, when the authorized user starts walking away, and moves beyond the predefined distance from the companion electronic device, the wearable electronic device transmits a deactuation credential causing the companion electronic device to enter a locked mode of operation.

In an alternate embodiment, the wearable electronic device is brought too close for access, but hysteresis allows it to go back and maintain access until further separation. Illustrating by example, imagine the authorized user is sitting in front of the companion electronic device, which is still a computer in this embodiment. Imagine that the wearable electronic device is a watch being worn on a wrist. Now imagine that the authorized user moves the wearable electronic device to within six inches of the display of the companion electronic device and then takes hand away. In one or more embodiments, the companion electronic device then starts presenting email until the range between the wearable electronic device and the companion electronic device exceeds two feet.

In one or more embodiments, the wearable electronic device detects, via its one or more sensors, public and private settings. This can be detected from images, sounds, and so forth. For example, a bar is louder than a quiet living room. Accordingly, detecting lots of sounds could indicate a public environment, while little sound indicates a private environment. Similarly, capturing an image that says "neighborhood saloon" can indicate a public environment, while capturing an image of a shower or tub can indicate a private environment.

In one or more embodiments, the wearable electronic device switches authorized user credential sharing from a more public one to a more private one based upon environment. For instance, when a public environment is detected, perhaps the companion electronic device only presents information the authorized user doesn't mind sharing publicly. By contrast, when in a private environment perhaps the companion electronic device presents any and all information. In one or more embodiments, when in a public context, the gaze direction is substituted seamlessly and adaptively by proximity for non-private environments. When many people are detected as gazing at the zed, this proximity feature can override the gazing feature.

When the companion electronic device comprises a doorbell camera, initially a person is authenticated to the wearable electronic device as the authorized user via voice, fingerprint, or facial recognition. One or more sensors detect the wearable electronic device being worn.

An authorized user then walks toward a front door adjacent to the companion electronic device. The wearable electronic device identifies the companion electronic device as a doorbell camera.

In one or more embodiments, the wearable electronic device accesses an engagement profile based upon the fact that the companion electronic device is a doorbell camera. In one or more embodiments, when the authorized user gets less than three feet away from the companion electronic device, the wearable electronic device communicates an authentication credential to the companion electronic device. In one or more embodiments, the authentication credential causes the companion electronic device to unlock. However, at this point nothing is shared, accessed, or presented by the companion electronic device. Gaze is required.

If the wearable electronic device is a pair of glasses, and points to the companion electronic device, an imager of the wearable electronic device determines that the authorized user is gazing at the companion electronic device. Alternatively, the wearable electronic device can cause an imager of the companion electronic device to actuate and assess the direction of gaze of the authorized user via image analysis. In either case, when this occurs the wearable electronic device transmits an authentication credential to the companion electronic device causing the display of the companion electronic device to cause the doorbell camera to unlock in one or more embodiments.

When the companion electronic device comprises a vehicle, initially a person is authenticated to the wearable electronic device as the authorized user via voice, fingerprint, or facial recognition. One or more sensors detect the wearable electronic device being worn.

The authorized user then walks outside to the companion electronic device, which is parked. The companion electronic device transmits a beacon every second. The wearable electronic device receives this beacon when it is about thirty feet away from the companion electronic device. The beacon shares a device type identifier with the wearable electronic device.

In one or more embodiments, the wearable electronic device accesses an engagement profile based upon the fact that the companion electronic device is a vehicle. In one or more embodiments, when the authorized user gets thirty feet away from the companion electronic device, the wearable electronic device communicates an authentication credential to the companion electronic device. In one or more embodiments, the authentication credential causes the companion electronic device to unlock.

The authorized user then points the wearable electronic device toward the companion electronic device. The wearable electronic device delivers an authentication credential to the companion electronic device due to the directionality of a line of sight infrared beam emitted by the wearable electronic device within a twenty-degree cone being directed at the companion electronic device. In one or more embodiments, a mode of operation, e.g., start, unlock door, turn on air conditioning, is also transmitted to the companion electronic device. When the authorized user gets twenty feet away, the action is taken. Alternatively, the wearable electronic device can determine the type of companion electronic device using other techniques.

As shown and described, embodiments of the disclosure provides a secure and fast way to lock, unlock, or otherwise control a wireless companion electronic device. In one or more embodiments, a wearable electronic device receives a device type from a companion electronic device and engages a stored profile in the wearable electronic device for preparing engagement rules with the companion electronic device. In one or more embodiments, the wearable electronic device broadcasts a directional security beacon at the right distance when pointing at the companion electronic device. In one or more embodiments, the wearable electronic device grants access to the companion electronic device at the right distance when the authorized user is looking at device. In one or more embodiments, the wearable electronic device removes access to the companion electronic device at any distance when the authorized user is looking away from the companion electronic device.

In one or more embodiments, an imager of the wearable electronic device determines the gaze direction of the authorized user when triggered at the predetermined engagement distance with the companion electronic device. In one or more embodiments, a wireless communication circuit determined a presumptive gaze direction from a directional transmission, e.g., an infrared transmission, ultrasonic transmission, radio frequency transmission, or other transmission, that is triggered at the predetermined engagement distance with the companion electronic device. In still other embodiments, an imager of the companion electronic device can send images to the wearable electronic device to determine the gaze direction, with the imager of the companion electronic device triggered at the predetermined engagement distance with the companion electronic device.

In one or more embodiments, a wearability sensor determines whether access is maintained when gazing is no longer detected. In one or more embodiments, gazing is substituted by close wearable proximity when context is non-private. In one or more embodiments, the imager of either the wearable electronic device or companion electronic device, depending upon operating mode, is awakened at the right engagement distance prior to granting access to content in the companion electronic device.

In one or more embodiments, the wearable electronic device assesses a stored engagement profile in response to receiving a device type when one or both of distance and gazing directions are confirmed. In one or more embodiments, the wearable electronic device shares its stored profile for device type engagement when distance and gazing directions are confirmed, with the stored profile instructing what to do, what to share, when to cease, and so forth.

In one or more embodiments, the wearable electronic device includes an imager and recognizes a device type of one or more companion electronic devices. In one or more embodiments, the wearable electronic device assesses a wearable profile in response to receiving the device type to identify an engagement rule, e.g., distance and access details and broadcasts a directional beacon toward device in the same orientation as imager.

In one or more embodiments, the wearable electronic device includes a highly directional receiving antenna receives device type communication only when pointing to and/or looking at the companion electronic device, thereby inferring that the authorized user is in proximity with, and is looking at, the companion electronic device. In one or more embodiments, the wearable electronic device contains a highly directional communication circuit using ultrasound, infrared, or directional radio frequency transmission.

In one or more embodiments, beacon technology in the wearable electronic device is adaptively selected based on device type for best engagement. Accordingly, in one or more embodiments one or more processors of the wearable electronic device can adaptively select between delivering infrared signals, ultrasound signals, or radio frequency signals. The beacon technology of the wearable electronic device can also be adaptively selected based upon device type and background environment, e.g., sun, noise, etc., for best engagement with the companion electronic device.

In one or more embodiments, the wearable electronic device broadcasts a directional beacon that causes the receiving companion electronic device to respond with its device type. In one or more embodiments, the wearable electronic device continuously broadcasts its device type over a Bluetooth or other wireless link following software upgrades. In one or more embodiments, the wearable electronic device continuously broadcasts its device type over Bluetooth or another wireless link in response to a recent wearable beacon presence/detection. In one or more embodiments, the wearable electronic device communicates user credentials to a nearby device and instruct device to perform certain tasks when distance and orientations are met. Other nifty aspects offered by embodiments of the disclosure will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Illustrating by example, embodiments of the disclosure can add temporary blinking identification without loss of access for momentary loss of gazing. People tend to look away momentarily during companion electronic device use. If wearable electronic device continues to be worn, temporary looking away causes temporary blinking of screen (not loss of access and shared credentials). If wearable electronic device is no longer worn, access is terminated. If authorized user looks away for a long duration, even if wearable electronic device is still worn, access is revoked following a time window, and so forth.

In one or more embodiments, taking a wearable electronic device into an Internet of Things (Internet-of-things) environment can also allow an authorized user to do other things such interfacing with varieties of other smart devices like accessing smart home devices. In one or more embodiments, this is enabled by way of range hysteresis. Once the wearable electronic device grants access to a companion electronic device based on distance and gazing direction, the authorized user can move back few feet to work on treadmill and still has access or at least voice access instead of display access. AI machine learning could also be engaged to capture user distances and expected operations, including capturing history profiles/habits of function versus distance as well.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A wearable electronic device, comprising:
    one or more processors;
    one or more sensors; and
    a wireless communication circuit responsive to the one or more processors, the wireless communication circuit delivering an authentication credential to a companion electronic device in response to the one or more sensors identifying that the wearable electronic device operating within a predefined distance of the companion electronic device; and
    delivering an actuation command to the companion electronic device in response to the one or more sensors detecting a gaze of an authorized user of the wearable electronic device being directed at the companion electronic device;
    wherein the actuation command causes a display of the companion electronic device to transition to an ON state and begin presenting information to the authorized user.

2. The wearable electronic device of claim 1, further comprising a biometric sensor authenticating the authorized user of the wearable electronic device.

3. The wearable electronic device of claim 1, the wireless communication circuit delivering a deactuation command to the companion electronic device when the one or more sensors identify the gaze of the authorized user being directed away from the companion electronic device.

4. The wearable electronic device of claim 3, the deactuation command causing the display of the companion electronic device to cease presenting content and turn blank, and also causing the companion electronic device enter a locked mode of operation.

5. The wearable electronic device of claim 1, the wireless communication circuit delivering a deactuation command to the companion electronic device when the one or more sensors identify the wearable electronic device being beyond a predefined distance of the companion electronic device.

6. The wearable electronic device of claim 5, the deactuation command causing the companion electronic device to enter a locked mode of operation.

7. The wearable electronic device of claim 1, the wireless communication circuit delivering the actuation command to the companion electronic device only when the one or more sensors identify the wearable electronic device as being worn by the authorized user, and with the display of the companion electronic device initially remaining blank in an OFF state after the authorized user has been authenticated.

8. The wearable electronic device of claim 1, further comprising a memory storing one or more engagement profiles each defining the predefined distance.

9. The wearable electronic device of claim 8, each engagement profile further defining an operating mode to enter upon receipt of the actuation command.

10. A method in a wearable electronic device, the method comprising:
    detecting, by one or more sensors, a gaze of an authorized user of the wearable electronic device upon a companion electronic device; and
    delivering, by a wireless communication circuit, an actuation command instructing a user interface component of the companion electronic device to enter an active mode of operation by transitioning a display from an OFF state where the display is blank state to an ON state where the display is presenting information.

11. The method of claim 10, further comprising:
    detecting, by the one or more sensors, a cessation of the gaze of the authorized user of the wearable electronic device upon the companion electronic device; and
    delivering, by the wireless communication circuit, a deactuation command to the companion electronic device.

12. The method of claim 11, further comprising:
    detecting, by the one or more sensors, the companion electronic device moving beyond a predefined distance from the wearable electronic device; and
    delivering, by the wireless communication circuit, a deactuation credential to the companion electronic device.

13. The method of claim 10, further comprising delivering, by the wireless communication circuit with the actuation command, at least one user preference to the companion electronic device.

14. The method of claim 13, further comprising:
    receiving, by the wireless communication circuit from the companion electronic device, a device type identifier; and retrieving, by one or more processors from a memory of the wearable electronic device, an engagement profile for the companion electronic device as a function of the device type identifier.

15. The method of claim 14, the engagement profile identifying the at least one user preference.

16. The method of claim 13, further comprising:
capturing, by an imager of the wearable electronic device, one or more images of the companion electronic device; and
determining, by one or more processors, a device type identifier for the companion electronic device from the one or more images.

17. A wearable electronic device, comprising:
one or more processors operable with a memory, the one or more processors identifying a companion electronic device operating within a wireless communication radius of the wearable electronic device and retrieving from the memory an engagement profile as a function of a device type of the companion electronic device;
one or more sensors identifying that a gaze of an authorized user of the wearable electronic device is being directed at the companion electronic device; and
a wireless communication circuit delivering an actuation command causing the companion electronic device to enter a predefined operating mode identified by the engagement profile upon identifying that the gaze of the authorized user is directed at the companion electronic device.

18. The wearable electronic device of claim 17, the engagement profile defining a predefined distance within which the companion electronic device must be for the actuation command to be delivered.

19. The wearable electronic device of claim 17, the companion electronic device comprising an imager, one or more sensors identifying the gaze of the authorized user of the wearable electronic device being directed at the companion electronic device using the imager, and the engagement profile defining both a predefined distance at which the wireless communication circuit of the wearable electronic device should transmit an authentication credential and at least one user preference identifying a type of content to present on a display of the companion electronic device when the wearable electronic device transmits the actuation command.

20. The wearable electronic device of claim 17, wireless communication circuit delivering a deactuation command to the companion electronic device when the one or more sensors identify a cessation of the gaze of the authorized user of the wearable electronic device being directed at the companion electronic device.

* * * * *